United States Patent
Kawano

(10) Patent No.: US 11,883,960 B2
(45) Date of Patent: Jan. 30, 2024

(54) MOVING ROBOT, MOVING ROBOT CONTROL METHOD AND PROGRAM THEREFOR

(71) Applicant: NIPPON TELEGRAPH AND TELEPHONE CORPORATION, Tokyo (JP)

(72) Inventor: Hiroshi Kawano, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/773,033

(22) PCT Filed: Oct. 31, 2019

(86) PCT No.: PCT/JP2019/042760
§ 371 (c)(1),
(2) Date: Apr. 28, 2022

(87) PCT Pub. No.: WO2021/084680
PCT Pub. Date: May 6, 2021

(65) Prior Publication Data
US 2022/0388164 A1     Dec. 8, 2022

(51) Int. Cl.
*B25J 9/16*     (2006.01)
*G05D 1/02*     (2020.01)

(52) U.S. Cl.
CPC .......... *B25J 9/1617* (2013.01); *G05D 1/0295* (2013.01); *G05D 1/0297* (2013.01); *G05B 2219/39001* (2013.01); *G05B 2219/40302* (2013.01)

(58) Field of Classification Search
CPC ... B25J 9/1617; G05D 1/0295; G05D 1/0297; G05D 1/0293; G05B 2219/39001; G05B 2219/40302
See application file for complete search history.

(56) References Cited

U.S. PATENT DOCUMENTS

| | | | |
|---|---|---|---|
| 10,481,614 B2 * | 11/2019 | Switkes | B60W 30/165 |
| 11,334,092 B2 * | 5/2022 | Luckevich | G05D 1/0297 |
| 2020/0192370 A1 * | 6/2020 | Devasia | G05D 1/0295 |

OTHER PUBLICATIONS

Vassilvitskii et al. (2002) "A Complete, Local and Parallel Reconfiguration Algorithm for Cube Style Modular Robots" IEEE International Conference on Robotics & Automation, May 2002, pp. 117-122.
Hiroshi Kawano (2018) "Distributed Tunneling Reconfiguration of Sliding Cubic Modular Robots in Severe Space Requirements" Proc. 14th International Symposium on Distributed Autonomous Robotic Systems, Oct. 15, 2018.

* cited by examiner

*Primary Examiner* — Kira Nguyen

(57) ABSTRACT

A mobile robot includes a position distance calculation command transmission unit 1, a position distance calculation command transfer unit 2, a reply position distance calculation command transmission unit 3, a direction storage unit 4, a reply position distance calculation command transfer unit 5, a first head robot unit determination command transmission unit 6, a robot unit determination unit 7, a first movement unit 8, a second movement unit 9, a next head robot unit selection command transmission unit 10 and a second head robot unit determination command transmission unit 11, for example.

6 Claims, 19 Drawing Sheets

Fig. 8
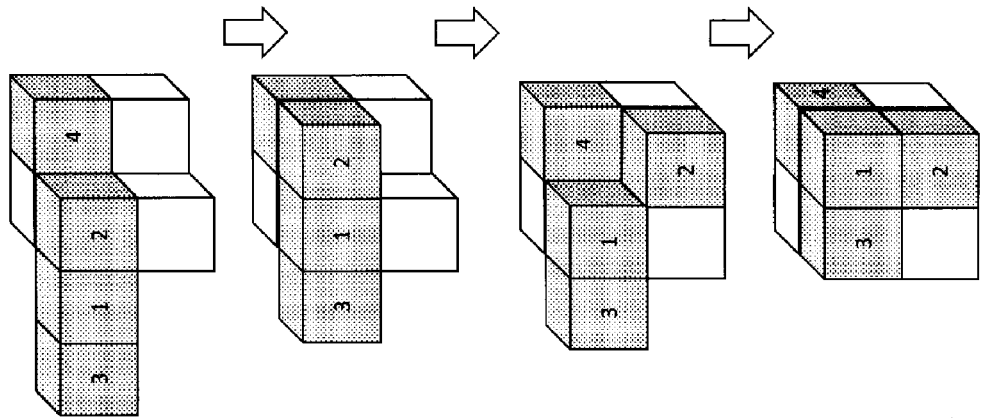
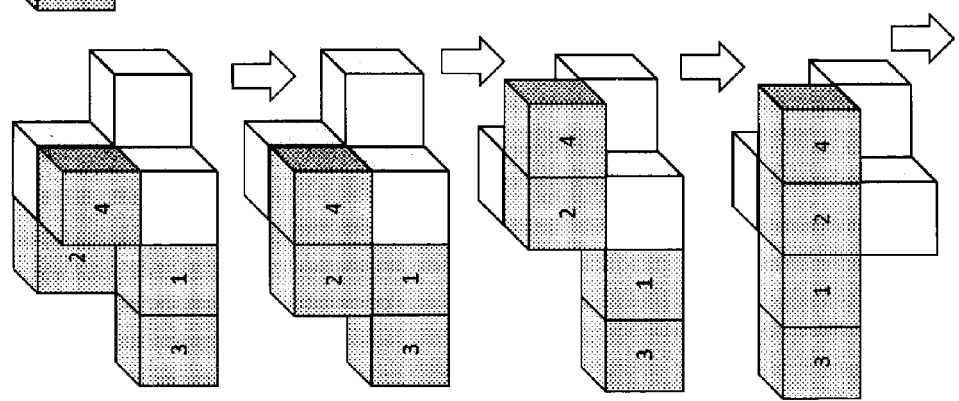
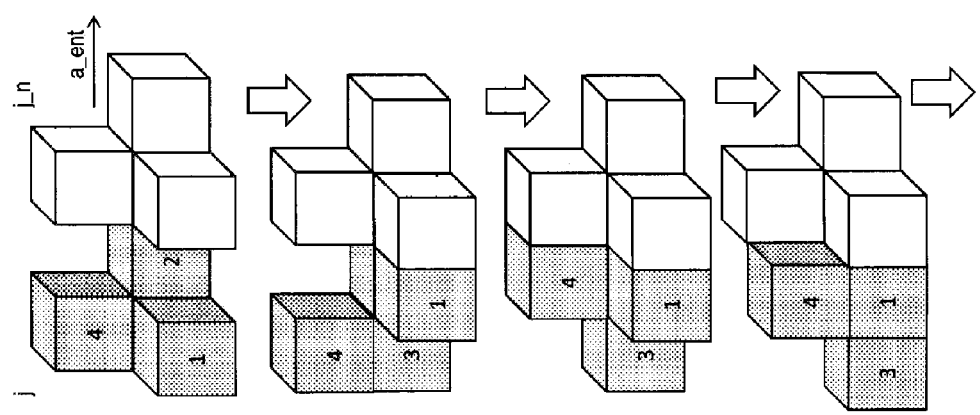

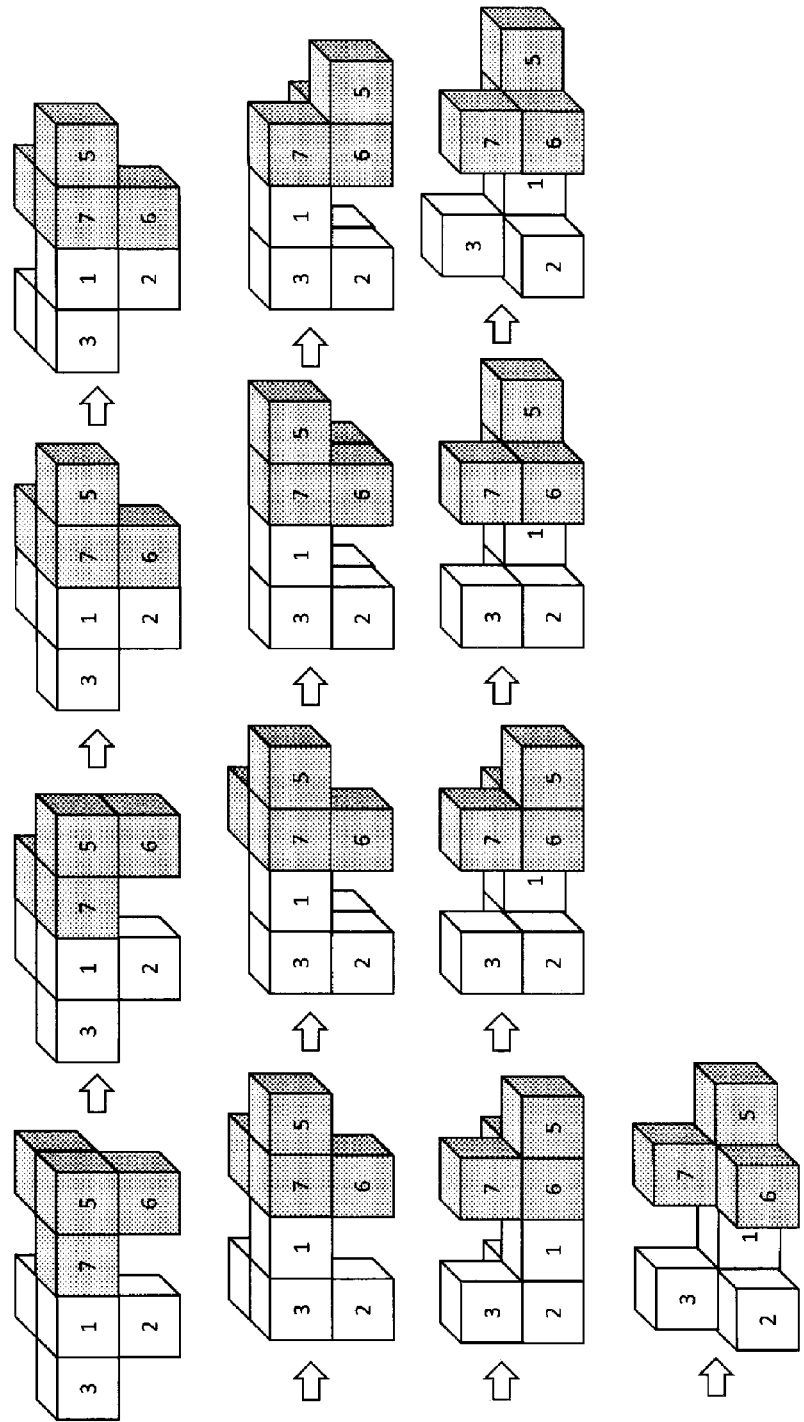

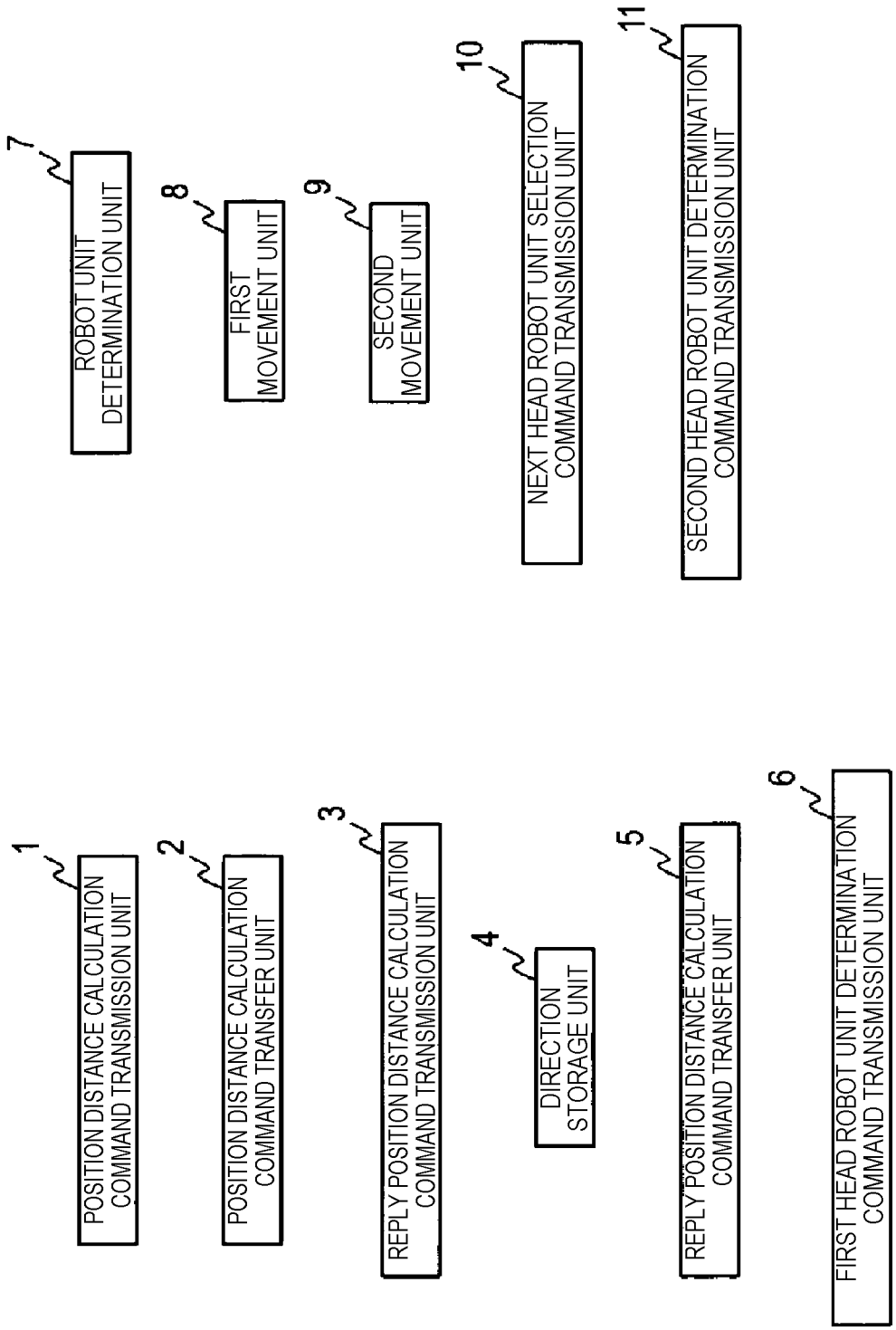

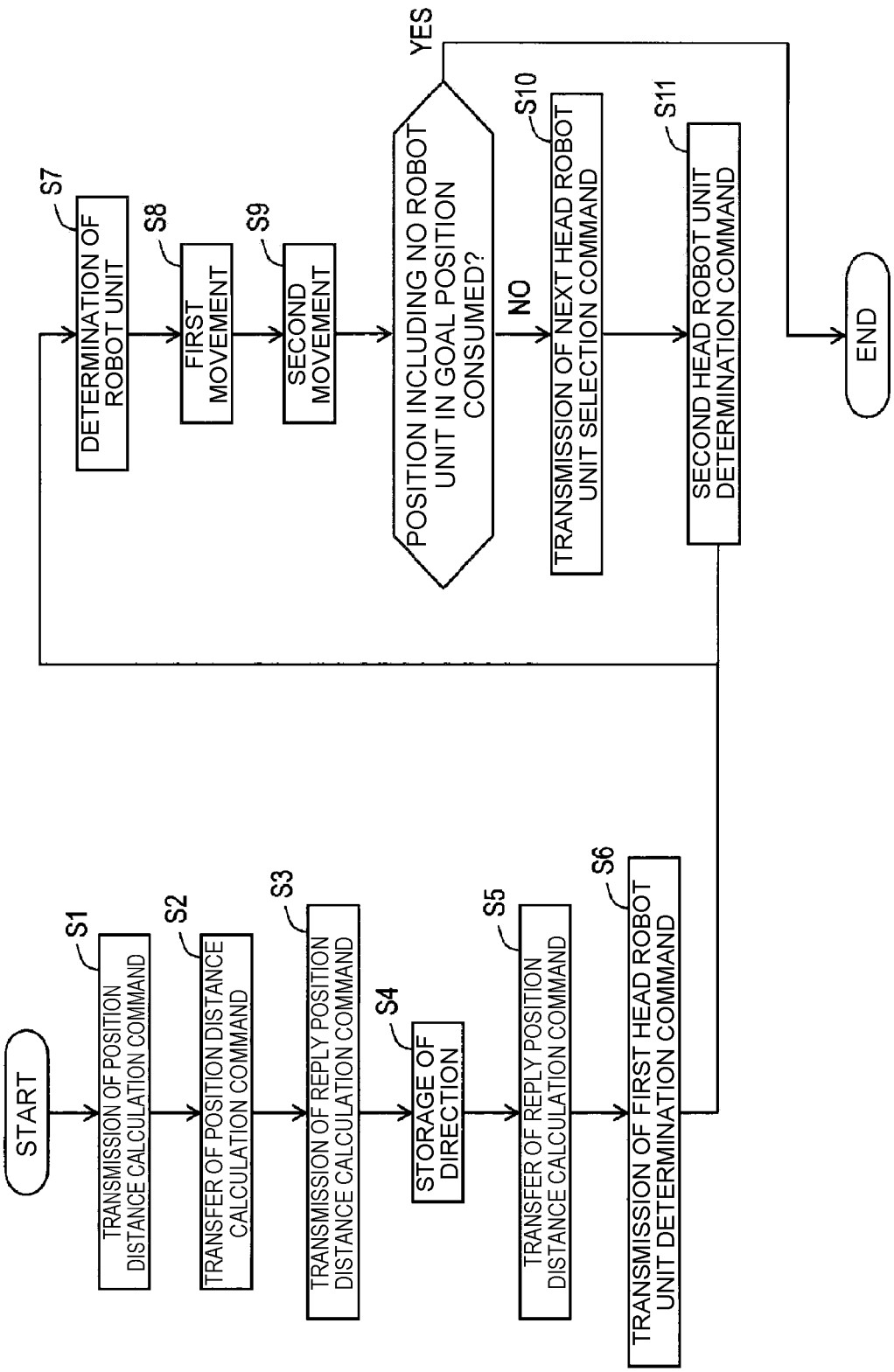

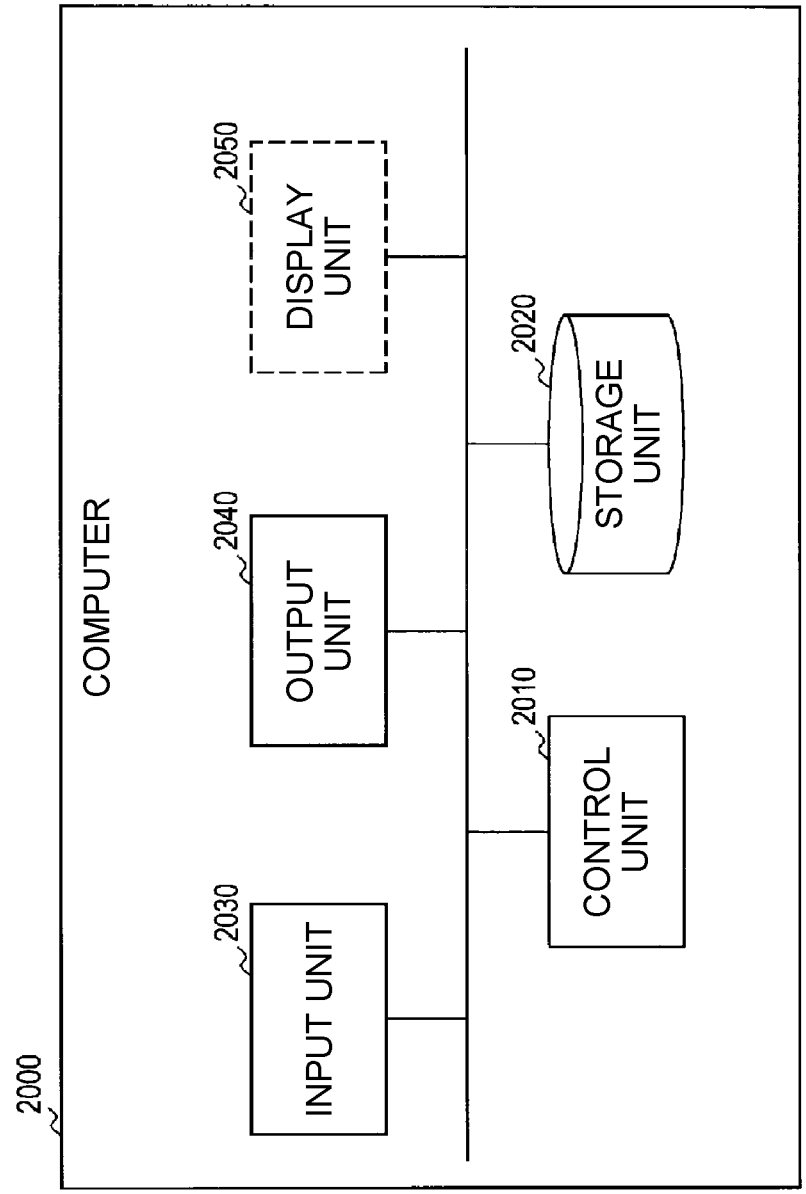

MOVING ROBOT, MOVING ROBOT CONTROL METHOD AND PROGRAM THEREFOR

CROSS-REFERENCE TO RELATED APPLICATIONS

This application is a U.S. National Stage Application filed under 35 U.S.C. § 371 claiming priority to International Patent Application No. PCT/JP2019/042760, filed on 31 Oct. 2019, the disclosure of which is hereby incorporated herein by reference in its entirety.

TECHNICAL FIELD

The present invention relates to a technique of controlling behavior of a plurality of robots.

BACKGROUND ART

In recent years, research for efficiently controlling a large number of autonomous mobile robots has been actively conducted. While the robots are assigned various tasks, such as monitoring places where people cannot enter, and transporting goods, there is a need for a technique to efficiently perform platoon formation by the cooperative operation of a large number of robots, and research has been actively conducted.

In particular, in robot platoon control, in robot platoon control under the assumption that the robots move as a whole like an amoeba while the robots are in a state remaining in contact with one another there is an advantage that the absolute position of each robot can be determined and an advantage that no additional equipment for position measurement is required, from the relative positional relationship among the robots, and research on such robots is also being conducted. For example, in a series of studies leading to the study shown in Non-Patent literature 1, platoon control that changes one platoon to another platoon is shown (Refer to Non-Patent Literature 1, for example.).

In order to realize efficient platoon formation by a large number of robots like this, it is important to plan placement and an operation order of respective robots in advance. In such a plan, the existence of obstacles, the shape of the route and the like in the actual environment where a plurality of robots operate must be fully considered as a matter of course.

In the method shown in the study shown in Non-Patent Literature 1, robot platoon transformation by an extension/contraction surface operation among a plurality of cubic robots (operation in which one robot moves while extending/contracting in a state in contact with other robots) is dealt with.

In Non-Patent Literature 2, an operation in the state where the respective robots are in contact with one another is assumed, and the respective robots have the same characteristics (homogeneous). In other words, platoon control in the case that the goal positions of the respective robots in the targeted form are not determined is realized. Robot platoon transformation by a surface shear operation among a plurality of cubic robots (operation in which one robot slides on a contact surface in a state in contact with other robots) is dealt with. It can be applied even when there is a non-connected spot in a common part in the set of the platoon positions taken by the robots in the initial state and the set of the goal positions of the robots, and is implemented by the distribution control method.

CITATION LIST

Non-Patent Literature

Non-Patent Literature 1: S. Vassilvitskii, M. Yim, J. Suh, "A Complete, Local and Parallel Reconfiguration Algorithm for Cube Style Modular Robots", in Proc. 2002 IEEE Int. Conf. Robotics and Automation, pp. 117-122, Washington, DC, May 2002.

Non-Patent Literature 2: H. Kawano, "Distributed Tunneling Reconfiguration of Sliding Cubic Modular Robots in Severe Space Requirements", in Proc. $14^{th}$ Int. Symposium on Distributed Autonomous Robotic Systems, paper no. 1, Boulder, CO, October 2018.

SUMMARY OF THE INVENTION

Technical Problem

In Non-Patent Literature 2, the robot platoon capable of platoon formation is limited to the platoon formed by a robot unit of 2×2×2, and there is no guarantee that the robots in the same robot unit continue to be in the same robot unit before and after platoon transformation.

Thus, an object of the present invention is to provide a mobile robot, a control method of the mobile robot and a program that realize platoon control applicable even when there is a non-connected spot in a common part of a set of initial positions of robot units and a set of goal positions of robot units by a method of distribution control, and have a guarantee that robots in a same robot unit continue to be in the same robot unit before and after platoon transformation.

Means for Solving the Problem

A mobile robot according to one aspect of the invention includes, when a predetermined initial position and a predetermined goal position are set for each of robot units, a common part of the initial position and the goal position is a common position, a set of the common positions is formed by at least one partial common position set that is not adjacent to each other, and it is called connectivity of a robot structure that robot units form a mass robot structure by each of the robot units being adjacent to other robot units, a position distance calculation command transmission unit that in a case of being a predetermined robot i_root in any robot unit in the robot units, transmits a position distance calculation command including a relative position from a position of the robot i_root and a number of times of transmission and transfer of the position distance calculation command that are respectively set at predetermined initial values to an adjacent robot, a position distance calculation command transfer unit that, upon receipt of the position distance calculation command, increments the number of times of transmission and transfer included in the position distance calculation command, updates the relative position included in the position distance calculation command according to a direction in which the position distance calculation command is received, and transfers a position distance calculation command including the incremented number of times of transmission and transfer and the updated relative position to an adjacent robot other than the robot that transmits the position distance calculation command only once, a reply position distance calculation command transmission unit that, when the position distance calculation command is received first, transmits a reply position distance calculation command including the incremented number of times of transmission and transfer and the updated relative position to the robot that transmits the position distance calculation command, a direction storage unit that stores a direction of the robot that transmits the position distance calculation command as an a_to_root direction when the position distance calculation command is received first, a reply position distance calculation command transfer unit that, upon receipt of the reply position distance calculation command, transfers the received reply position distance calculation command in the a_to_root direction read from the direction storage unit, a first head robot unit determination command transmission unit that in a case of being the robot i_root, and upon receipt of reply position distance calculation commands transmitted by all robots, selects a certain partial common position set as a set Up based on a position of each of the robots based on relative positions included in the reply position distance calculation commands, selects a position that is adjacent to a position that belongs to a set of goal positions but does not belong to the set of the common positions, and belongs to the set Up, as a head position Head, and transmits a head robot unit determination command including information on the relative position and the set Up, to a predetermined robot in a head robot unit that is a robot unit located in the head position Head, a robot unit determination unit that in a case of being the predetermined robot in the head robot unit, and upon receipt of the head robot unit determination command, determines robot units H0, H1, ..., Hnt−1 included in a path from the head position Head to a tail position Tail, with a position of a tail robot unit that is a robot unit located in a position that does not belong to the set Up and located in the initial position, and is a robot unit that can maintain connectivity of the robot structure even when the robot unit is moved, as the tail position Tail, a first movement unit that in a case of being a predetermined robot in a robot unit Hi, where i=0, ..., nt-2, moves the robot unit Hi to a destination position D, or a position in which a robot unit Hi−1 is located before movement by the first movement unit while extending a robot unit Hi+1, with a position that is a position adjacent to the head position Head, and belongs to the set of the goal positions but does not belong to the set of the common positions, as the destination position D, a second movement unit that in a case of being a predetermined robot in a robot unit Hnt−2, moves a robot unit Hnt−1 to a position where the robot unit Hnt−2 is located before movement by the first movement unit, a next head robot unit selection command transmission unit that in a case of being a predetermined robot in the robot unit Hnt−2, transmits a next head robot unit selection command to a predetermined robot in the head robot unit, and a second head robot unit determination command transmission unit that in a case of being a predetermined robot in the head robot unit, and upon receipt of a next head robot unit determination command, when there is a robot unit that is in contact with the set Up and is not located in the set Up but located in the goal position after the destination position D is added to the set Up, updates the set Up by adding a position of the robot unit, and a position of a robot unit in a connected state via only the goal position from the robot unit to the set Up, updates the relative position, selects a position that is a position adjacent to a position that belongs to the set of the goal positions but does not belong to the set of the common positions, and belongs to the set Up, as a head position Head, based on a position of each of the robots based on the relative position, and transmits a head robot unit determination command including information on the relative position and the set Up to a predetermined robot in a head robot unit that is a robot unit located in the head position Head, wherein processes of the robot unit determination unit, the first movement unit, the second movement unit, the next head robot unit selection command transmission unit and the second head robot unit determination command transmission unit are repeatedly performed until there is no position including no robot unit in the goal position.

Effects of the Invention

The platoon control that is applicable even when there is a non-connected spot in the common part of the set of the initial positions of robot units and the set of the goal positions of robot units is realized by the method of distribution control, and there is a guarantee that robots in the same robot unit continue to be in the same robot unit before and after platoon transformation.

BRIEF DESCRIPTION OF DRAWINGS

FIG. 8 is a view for explaining movement of a robot unit.
FIG. 16 is a view for explaining movement of the robot unit.
FIG. 17 is a block diagram for explaining an example of a functional configuration of the robot.
FIG. 18 is a flowchart for explaining an example of a flow of processes of the robot.
FIG. 19 is a diagram showing a functional configuration example of a computer.

DESCRIPTION OF EMBODIMENT

Figure 1:
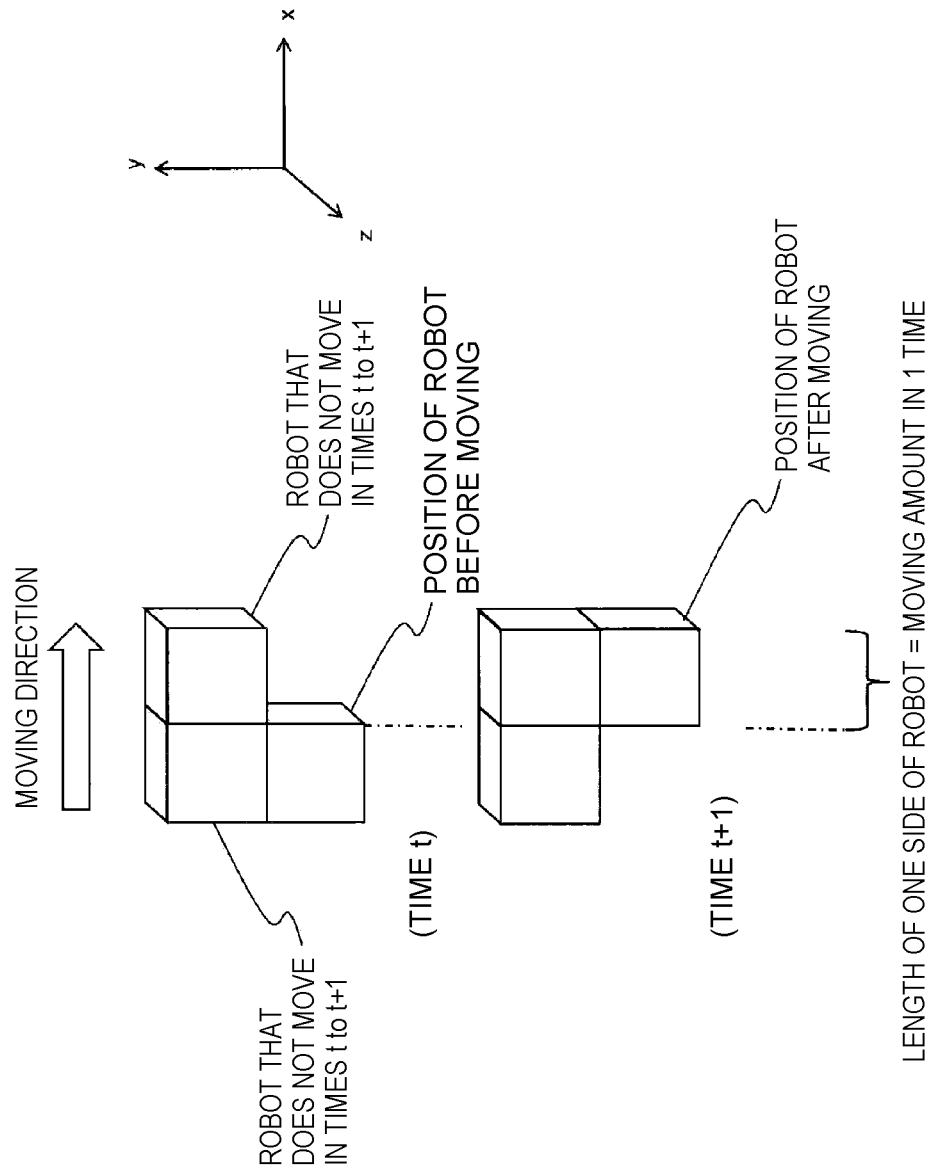
FIG. 1 is a view for explaining movement of a robot.

Hereinafter, an embodiment of the present invention will be described. In the drawings used in the following explanation, components having the same functions and the steps performing the same processes are assigned with the same reference signs, and redundant explanation is omitted.

<Theoretical Background>

First, a theoretical background of a mobile robot and a control method of the mobile robot will be described.

[Problem Setting]

Figure 2:
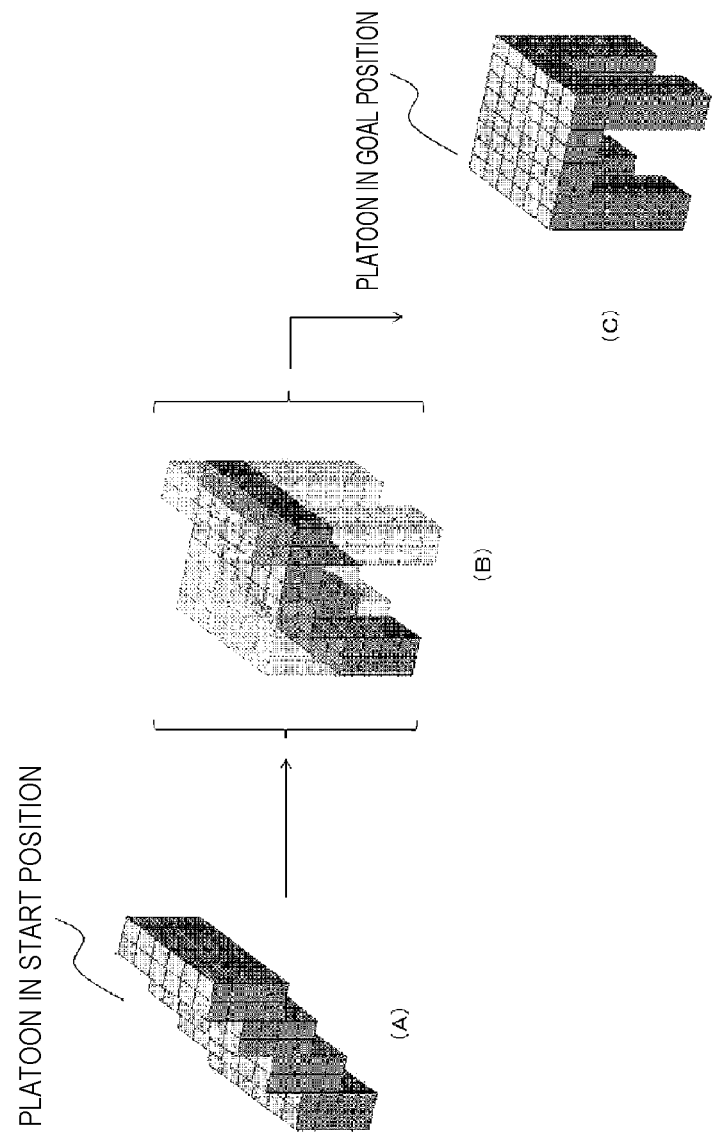
FIG. 2 is a view for explaining an initial position and a goal position of a robot unit.

The mission of a large number of robots to cooperate and move while maintaining a state where the respective robots contact one another, and to transform a platoon from a platoon formation state in a start position to a goal position envisions use of cubic robots that can slide surfaces that are in contact with one another and move, as illustrated in FIG. 1, for example. The mission is realized by movement of a plurality of robots from the start position to the goal position to the goal position in a room divided by a wall (note that the wall is omitted in the drawing) as shown in FIG. 2.

The robot moves while maintaining a state in which another robot exists in one of six boxes in a vertical, horizontal, and height directions (hereinafter, also referred to as "up, down, left, right, front, and rear directions") around the robot, as shown in FIG. 1, for example. This method has an advantage of being able to measure a moving amount of one operation accurately by one robot itself moving a distance corresponding to a size of one robot. Furthermore, by mutually measuring a relative position to an adjacent robot sharing one surface, a position of each robot in an entire group of robots can be easily known. Therefore, a problem that the platoon is broken by an error of the moving amounts of the robots is hardly caused. Furthermore, it is possible to move a plurality of robots simultaneously as the plurality of robots are connected. Note that the robot can know whether or not other robots exist in adjacent positions, whether or not an obstacle is present, and whether or not the robot itself is on the goal position.

The number of robots that conduct mission is p (p≥16=8×2), and each robot can move in X-Y-Z-axis directions in a three-dimensional space while sharing one or more surfaces with adjacent robots. Each cube in FIG. 1 represents a position of each robot. Only one robot can exist in each cube. It is assumed that each robot stands still when an obstacle or another robot is present in a direction in which the robot is going to move. Note that a cubic space in which the robot can exist is also called a box, or a grid. In FIG. 2, dark gray boxes show positions in which robots exist. A position in which the robots exit in FIG. 2A shows a set of start positions of the robots. A position in which the robots exist in FIG. 2C shows a set of goal positions of the robots. As shown in FIG. 2B, the set of the goal positions and the set of the start positions are in contact with each other. A region expressed by the set of the goal positions is also called a goal platoon area. In this way, the respective start positions and the respective goal positions are respectively adjacent to the other start positions and goal positions in at least any direction of the vertical, horizontal and height directions, and platoon shapes in the start positions and the goal positions of the robots are each one mass in any shape.

[Coordinate Setting of Robot]

When a position of each robot i (i represents a robot number i=0, 1, 2, 3, . . . , p−1) is (Xr[i], Yr[i], Zr[i]), the initial position is (Xr0[i], Yr0[i], Zr0[i]), and the goal position is (Xre[i], Yre[i], Zre[i]), this problem can be defined as finding an action plan for the robots placed in the initial position to move to the goal position. The set of the start positions of the robots is set as s, and the set of the goal positions (Xre[i], Yre[i], Zre[i]) is set as g.

[Definition of Mission Space]

When i is a robot number, each state (position and action of the robot) of the robot i is expressed by a discrete value. When a room is expressed by a three-dimensional space consisting of an orthogonal coordinate system of X, Y, and Z, each position is expressed by values expressed by discretizing the X-axis, Y-axis and Z-axis. In other words, the room (three-dimensional space) is divided by grids, and each grid corresponds to each position. Furthermore, in each grid, "presence/absence" of an obstacle is set in advance.

[Definition of Robot Operation]

Furthermore, an action subject is each robot placed in the room. An action "a" of the robot i (i is a robot number) takes one of a total of seven types: stationary, and movement of one grid in the vertical, horizontal, and height directions. For example, when a ∈ {0, 1, 2, 3, 4, 5, 6}, 0: stationary 1: moves only one grid in a positive X-axis direction in the three-dimensional space 2: moves only one grid in a positive Y-axis direction in the three-dimensional space 3: moves only one grid in a negative X-axis direction in the three-dimensional space 4: moves only one grid in a negative Y-axis direction in the three-dimensional space 5: moves only one grid in a positive Z-axis direction in the three-dimensional space 6: moves only one grid in a negative Z-axis direction in the three-dimensional space

[Problem in Search Calculation]

A state-space in such a mission environment has states of a dimension number of 3 multiplied by the number of robots, and the number of selectable actions exists as many as the number of robot actions (=7) to the power of the number of robots. For example, when the number of robots is 50, and the numbers of grids in the vertical, horizontal and height directions of the room are respectively 20, the number of states is 20 to the power of 150, and the amount of resources required for search calculation is enormous. Furthermore, each time one robot is added to the number of robots, the number of states increases 8000 times. As explained in the paragraph of "Problem Setting" in the present embodiment, when the constraint condition that the robots are in contact with one another is incorporated, search calculation has to be performed in consideration of mutual movement of the robots, so that reduction in fundamental calculation amount is difficult, which becomes a big problem in the case of using a plurality of robots.

[Characteristics in Non-Patent Literature 3]

In heterogeneous platoon control in Non-Patent Literature 3, the concept of void control is introduced as one of the measures to solve the problem of calculation load described above. Furthermore, the concept of an 8-box robot unit is also introduced to overcome the problem of platoon transformation as described in [Problem Setting].

Figure 3:
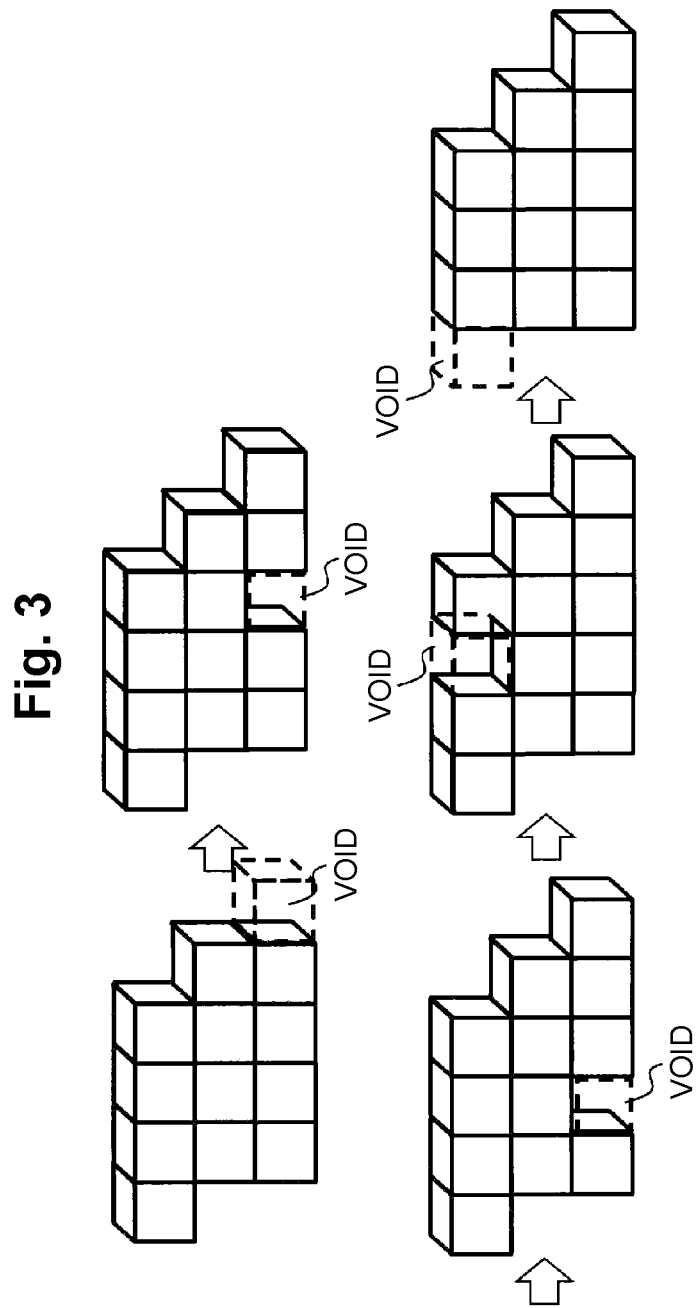
FIG. 3 is a view for explaining a state of movement of a void.

First, the void control will be described. The void mentioned here is a gap that is created in the original position after a certain robot has moved to another position, as illustrated in FIG. 3. In other words, a void is a virtual existence that moves in an opposite direction to a direction in which a robot moves. Since an attention is paid to the operations of a plurality of robots in the platoon formation problem of the swarm robot like this, the search calculation amount explodes, but when the perspective is changed and attention is paid to the motion of a void, it is possible to consider the problem of the operation plan of a large number of robots as an operation plan of a single void, which is suitable to reduction in search calculation load. However, the respective robots belonging to a robot unit are separate during transformation operation, and respectively separated into different robot units, which leads to an increase in the load of the subsequent robot replacement operation. Furthermore, the void control is inapplicable to the case where the initial position and the goal position have a common part, and the common part is divided into a plurality of non-connected parts.

[Reference Literature 3] Kawano, H., "Tunneling-Based Self-Reconfiguration of Heterogeneous Sliding Cube-Shaped Modular Robots in Environments with Obstacles", 2017 IEEE International Conference on Robotics and Automation, pp. 825-832, May 2017, Singapore.

[Introduction of 4-Box Robot Unit]

Thus, as shown in FIG. 4A, four adjacent robots are made one unit (robot unit), and the robots is assumed to move while maintaining the robot unit. In other words, one robot unit is formed for every four robots, and the four robots that form one robot unit move while maintaining a state of being adjacent to other robots that form the one robot unit in three directions, respectively. A group of the robot units is controlled so as to share one surface with one another in each robot unit and move while being in contact with one another. The four robots belonging to the same robot unit are the same and homogeneous, and in the same robot unit, it does not matter which robot is in which position in the unit.

The reason for performing movement with the four robots as one unit like this is that robots belonging to other robot units can pass through four gap spaces inside each of the robot units, and thereby it is easy for robots belonging to different robot units to come and go. Furthermore, it is also easy to maintain connectivity when the robots belonging to the other robot units pass through the four gap spaces inside each of the robot units. In other words, this leads to reduction in calculation load for considering connection of the robots in determination of operations of the respective robots for which maintaining a platoon form must be considered.

Here, the robot unit formed by four robots is assumed to be one box-unit (in the present embodiment, hereinafter, the unit is also referred to as a "box unit" or a "position unit"), and a state-space is formed with one box-unit as one state. When a position of a robot unit is $(Xr\_u[j], Yr\_u[j], Zr\_u[j])$ ($j=0, 1, 2, \ldots j\_max-1$), if the robots in a robot unit j are i1, i2, i3, and i4, $$Xr[i1]=2 \times Xr\_u[j]$$

$$Yr[i1]=2 \times Yr\_u[j]+1$$

$$Zr[i1]=2 \times Zr\_u[j]$$

$$Xr[i2]=2 \times Xr\_u[j]+1$$

$$Yr[i2]=2 \times Yr\_u[j]$$

$$Zr[i2]=2 \times Zr\_u[j]$$

$$Xr[i3]=2 \times Xr\_u[j]$$

$$Yr[i3]=2 \times Yr\_u[j]$$

$$Zr[i3]=2 \times Zr\_u[j]$$

$$Xr[i4]=2 \times Xr\_u[j]$$

$$Yr[i4]=2 \times Yr\_u[j]$$

$$Zr[i4]=2 \times Zr\_u[j]+1$$

Note that a variable that expresses the robot unit j to which the respective robots i belong is set as $Rr[i]=j$, and this is invariant at any time of platoon control. Furthermore, a variable that indicates in which position of i1, i2, i3 and i4 described above the robot is located is $Ir[i]=(1, 2, 3, 4)$. The initial position of each of the robot units is set as $(Xr\_u0[j], Yr\_u0[j], Zr\_u0[j])$, and the goal position is set as $(Xr\_ue[j], Yr\_ue[j], Zr\_ue[j])$. Hereinafter, a total number p of the robots is a multiple of 4.

Note that as in FIG. 4B, it is also possible to form an 8-box robot unit by combining two robot units, and platoon control of a robot group formed by the 8-box robot unit is enabled by performing control of the 4-box robot unit.

Figure 4:
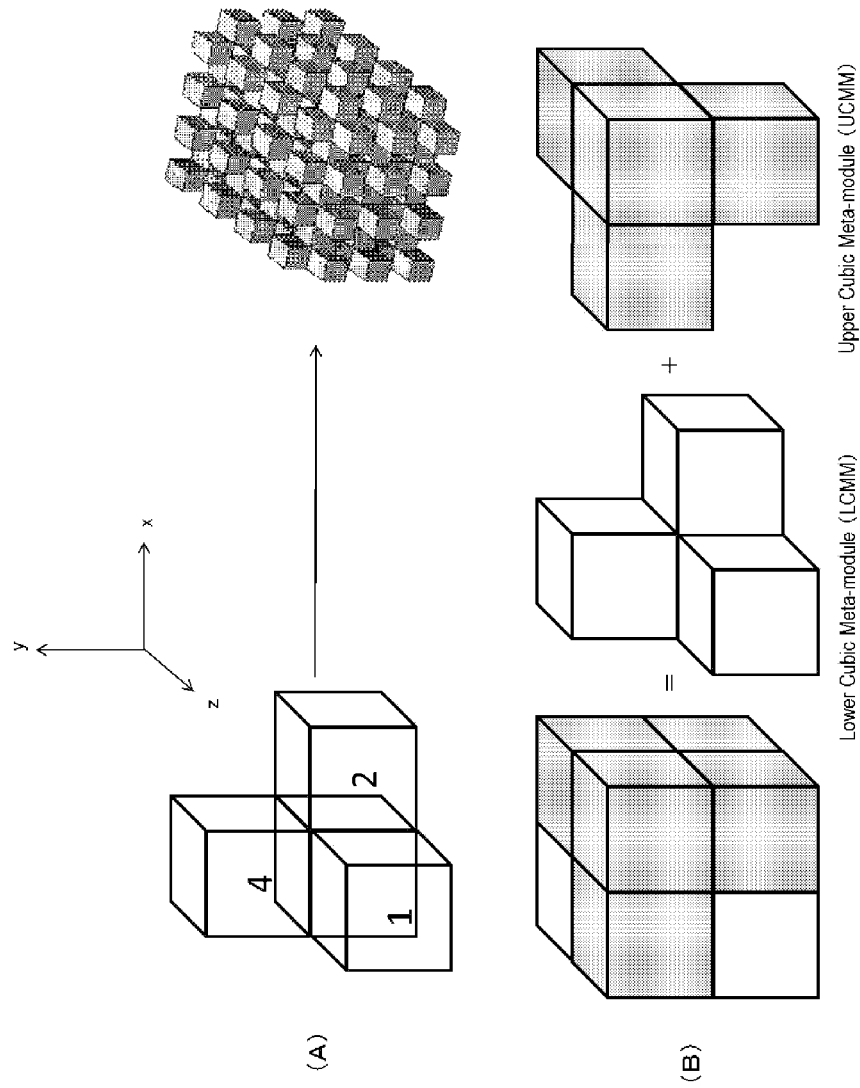
FIG. 4 is a view for explaining an example of a robot unit.

Furthermore, the robot unit can be configured to satisfy the following conditions regardless of the example of FIG. 4. In other words, the robot unit is (1) a partial structure in a cubic space (hereinafter, the space is a meta-module) having a length M ($M \geq 2$, note that a length of one robot is a length 1) in each axis direction in a three-dimensional orthogonal coordinate system (in other words, the robot unit occupies a part of the meta-module), and includes a structure in which (2) the number of robots included in the robot unit in the meta-module, and the number of parts (that is, gaps) other than the robot units in the meta-module are equal, and (3) M robots are adjacent in each axis direction. For example, the robot unit illustrated in FIG. 4 is (1) a partial structure of the meta-module formed by a total of 8 cubes with the length M in each axis direction=2, and includes a structure in which (2) the number of robots in the robot unit is 4, the number of gaps in the meta-module is 4, and the number of robots and the number of gaps are equal, and (3) two robots are adjacent to each other in each axis direction.

In the following explanation, the case where the structure formed by the four robots shown in FIG. 4 is made the robot unit will be described as one example of the robot unit, but a robot unit that is configured to satisfy the aforementioned conditions (1) to (3) in a meta-module of a size of $M^3$ units, for example, can provide a same effect.

[Homogeneous Platoon Control]

Hereinafter, a method of homogeneous robot platoon control of placing the respective robot units j in any position $(Xr\_ue[j], Yr\_ue[j], Zr\_ue[j])$ of a set of the goal positions respectively, from a state where the respective robot units j exist in arbitrary positions, in a set S of the start positions will be described.

Here, sets S and G are formed by an 8-box robot unit that is formed by combining two 4-box robot units. A number j_max of 4-box robot units is an even number, and there is a relationship of $j1+j\_max/2=j2$ between the numbers of the two 4-box robot units j1 and j2 that form the one 8-box robot unit. In the case of j_max=8, 0, 1, 2 and 3 correspond to j1, and 4, 5, 6, and 7 correspond to j2, and pairs of (j1, j2)=(0, 4), (1, 5), (2, 6), and (3, 7) form the 8-box unit. A 4-box robot unit expressed by dots in FIG. 4B is denoted by j2. A name of j1 is LCMM, and a name of j2 is UUCM.

Figure 5:
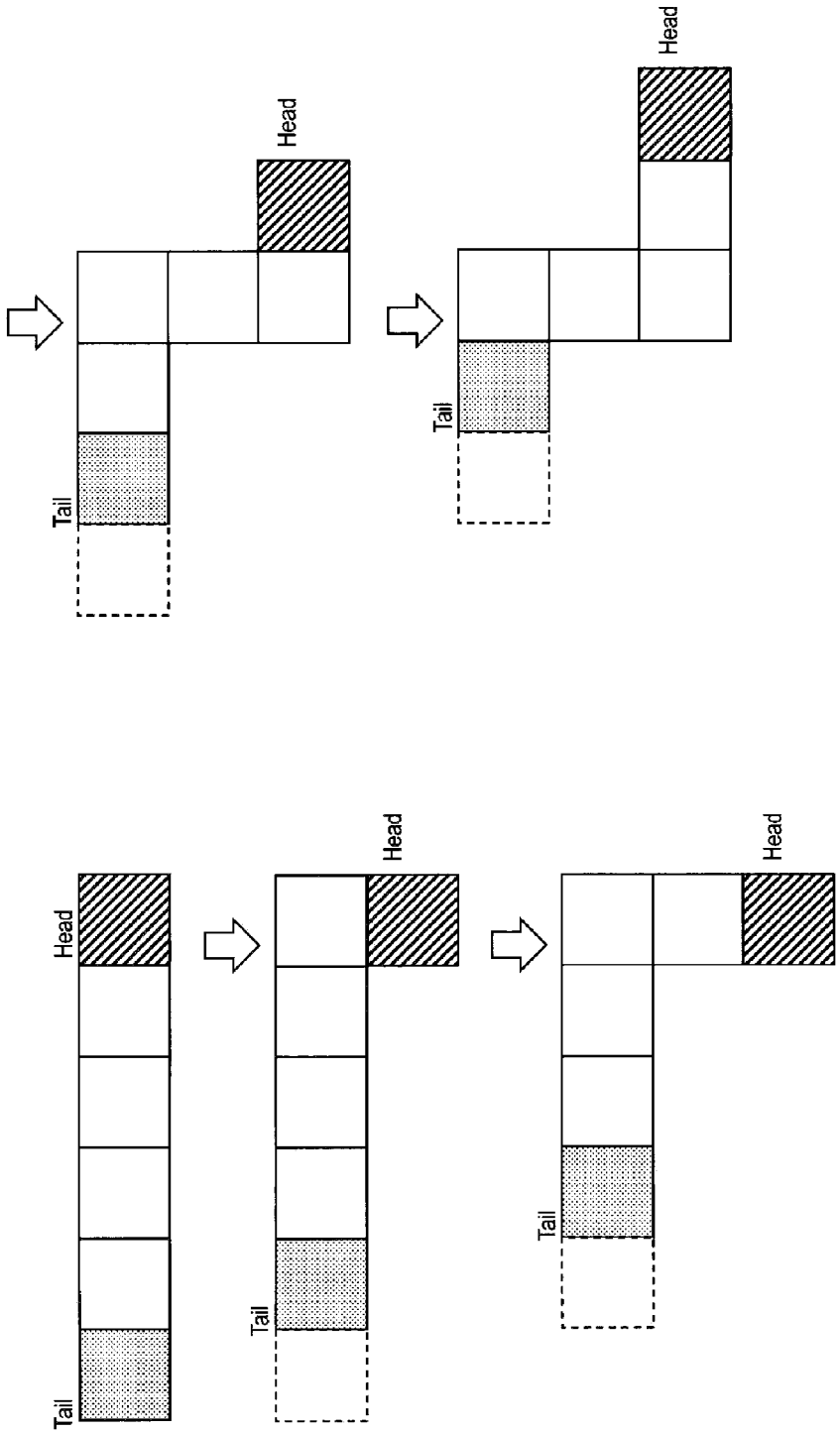
FIG. 5 is a view for explaining tunneling.

As shown in FIG. 5, in order to transform a robot structure in a state of the set S to a state of the set G, a method called tunneling is taken. In an operation shown in FIG. 5, a series of robot units that connects a robot unit Head at a head and a robot unit Tail at a tail moves in a method of following an operation of the head robot unit Head in a so-called snake-like form. Note that the tunneling operation is also the same in a robot unit that performs other tunneling, for example, the robot structure using the robot unit of 2×2×2 using the extension/contraction robot unit as shown in Non-Patent Literature 2, and a selection method of Head and Tail of tunneling shown in the present invention is similarly applicable. Platoon transformation using tunneling can execute a platoon transformation operation without using a position other than the set of initial positions and the set of the goal positions even in an environment with an obstacle.

Figure 6:
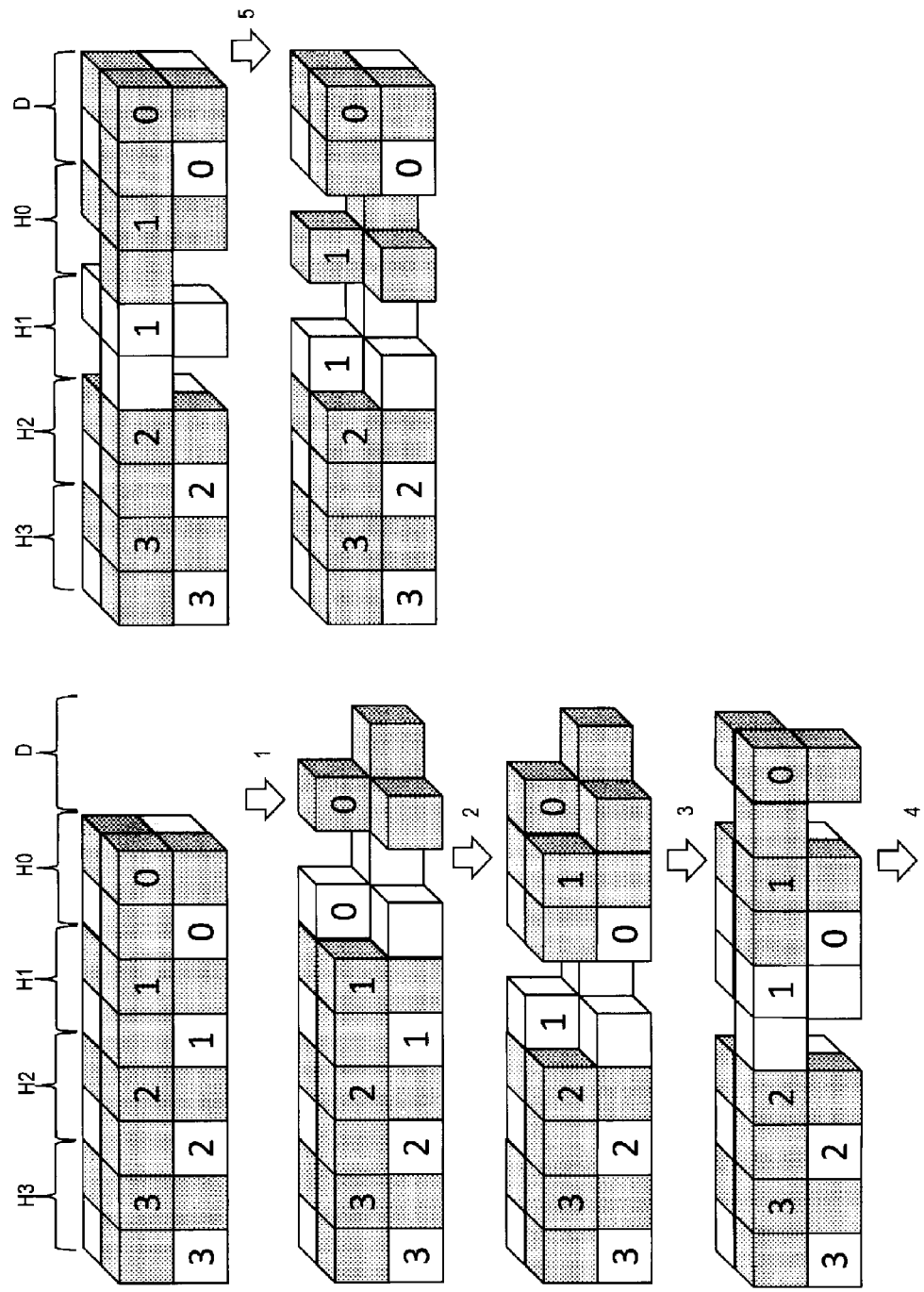
FIG. 6 is a view for explaining tunneling.
Figure 10:
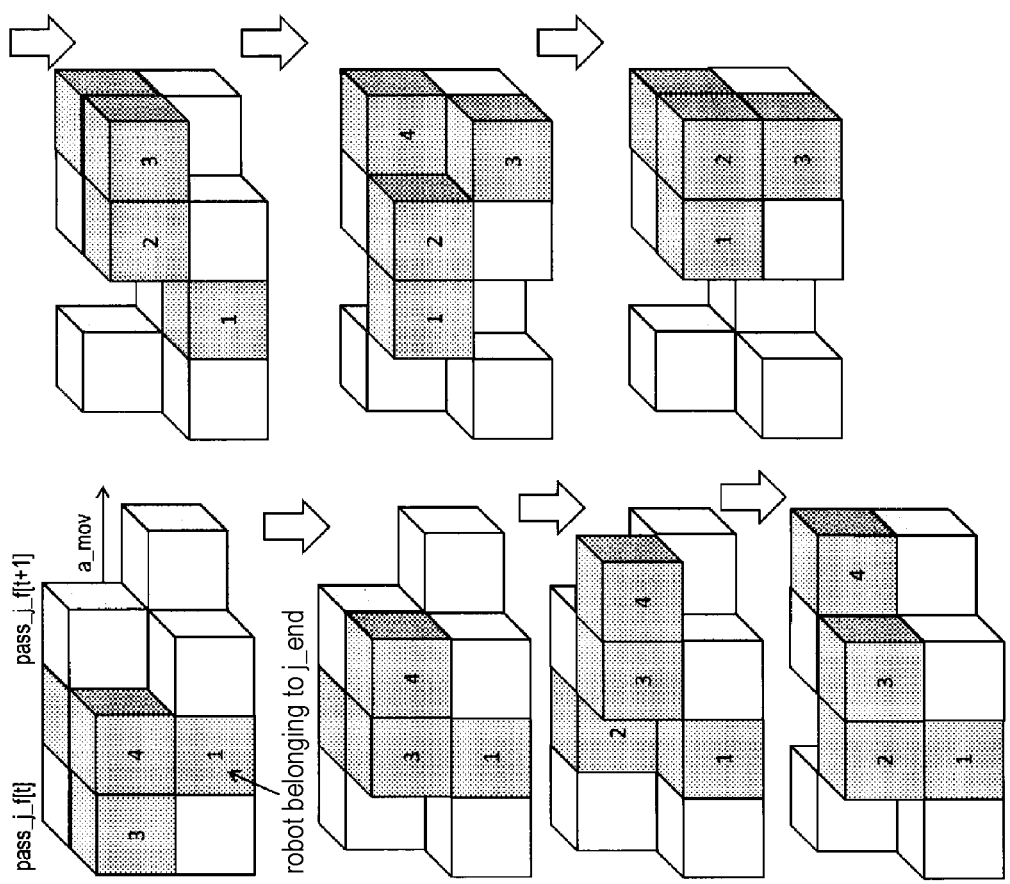
FIG. 10 is a view for explaining movement of the robot unit.
Figure 11:
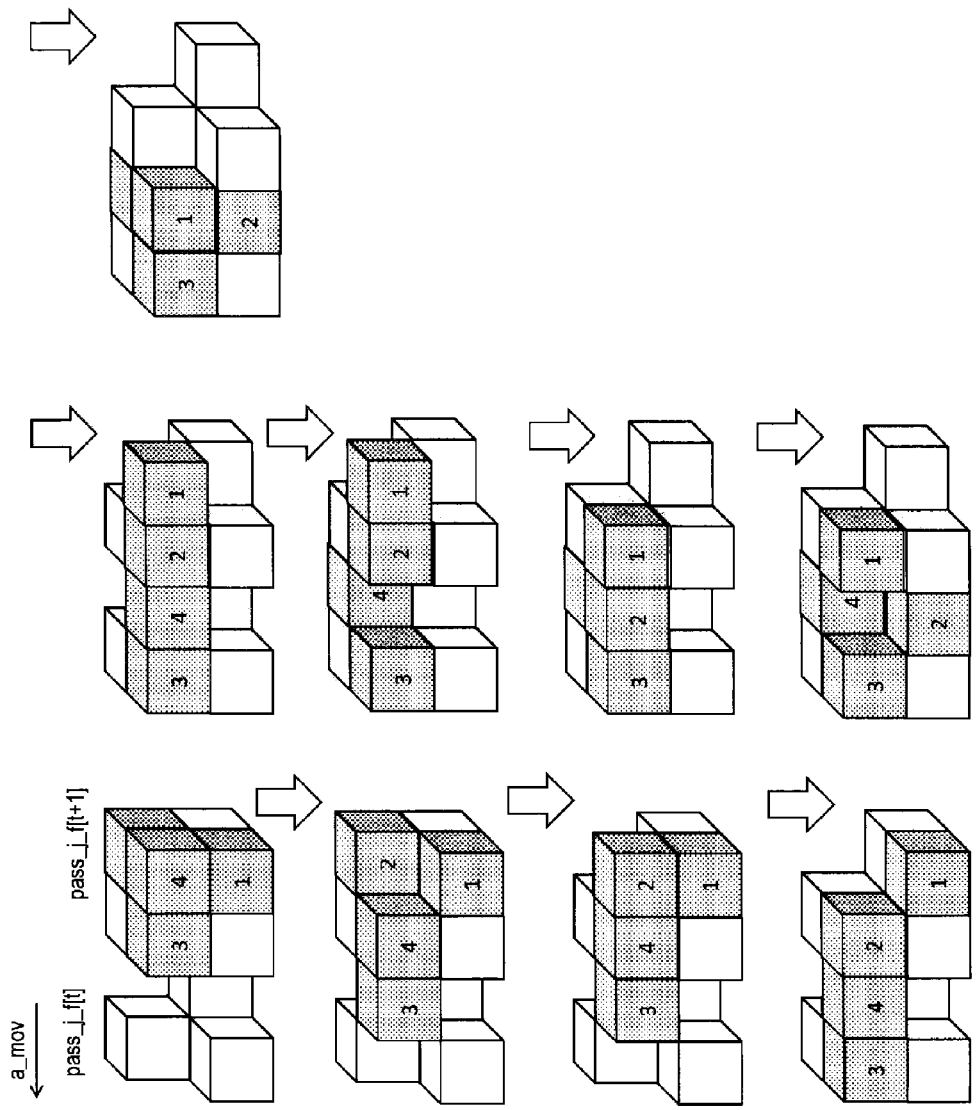
FIG. 11 is a view for explaining movement of the robot unit.
Figure 12:
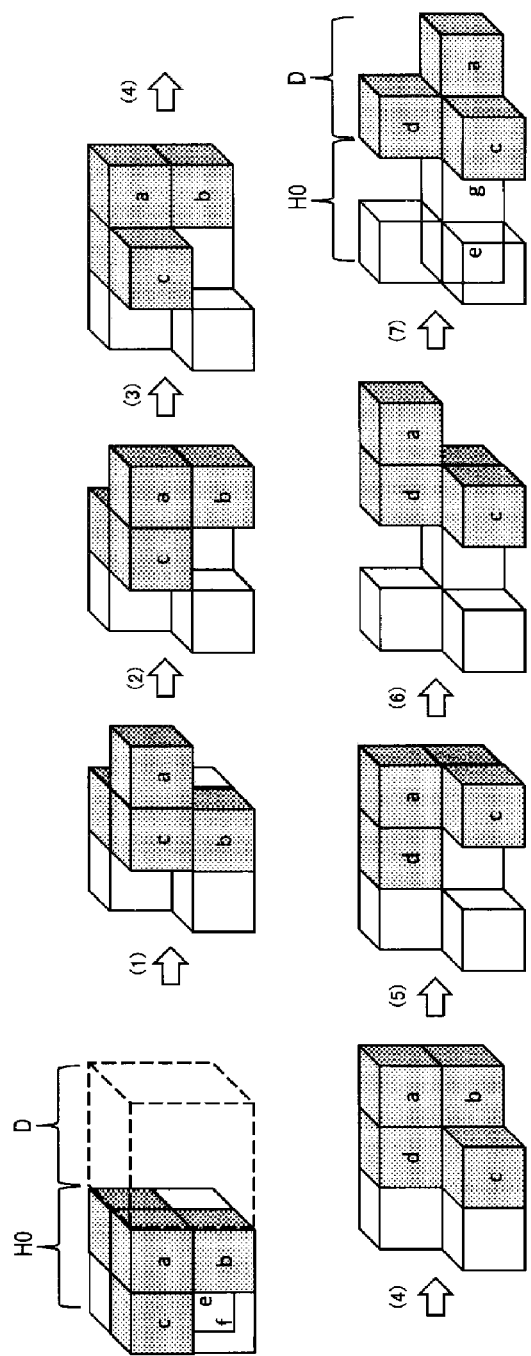
FIG. 12 is a view for explaining movement of the robot unit.
Figure 13:
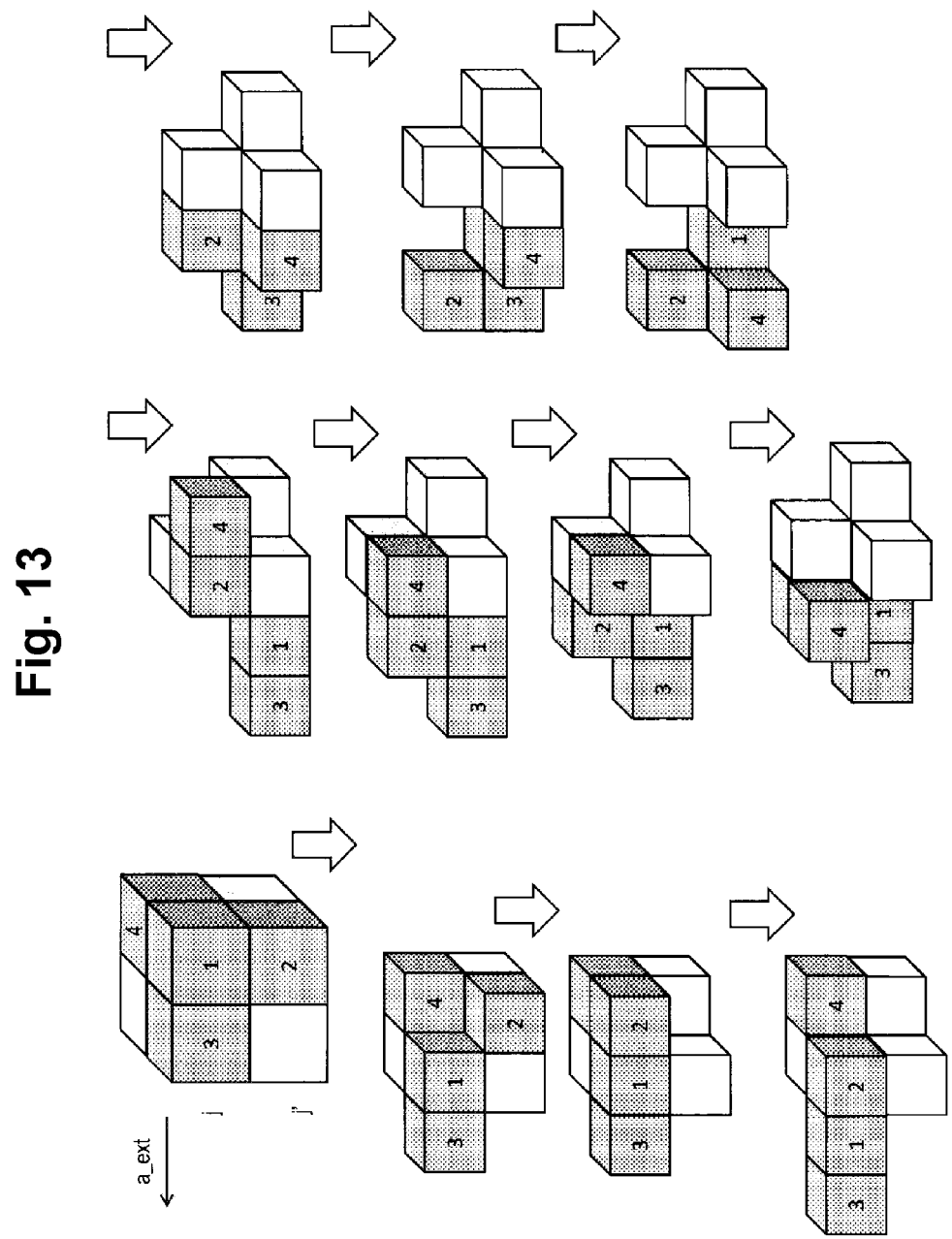
FIG. 13 is a view for explaining movement of the robot unit.
Figure 14:
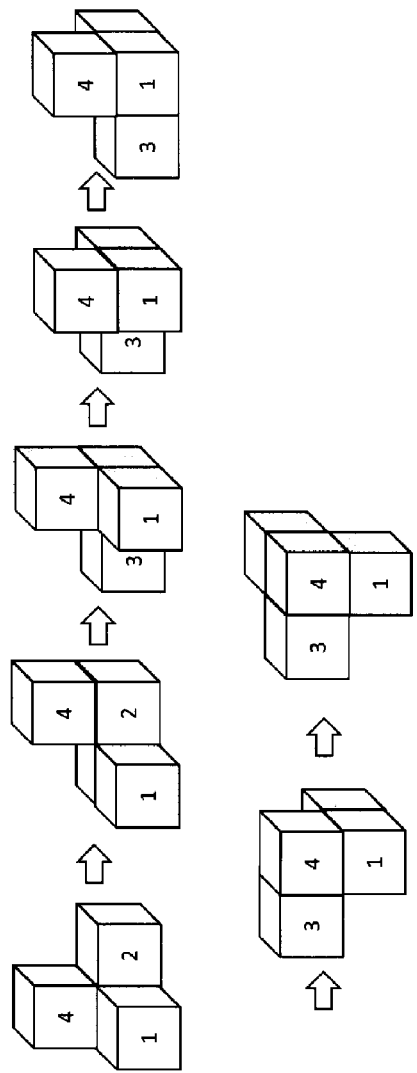
FIG. 14 is a view for explaining movement of the robot unit.

FIG. 6 shows one step of a tunneling operation of the 8-box robot unit using the two 4-box robot units used in the present invention. Details of an operation of a robot unit 0 in an operation 1 in FIG. 6 are as shown in FIG. 12. Details of an operation of a robot unit 1 in an operation 2 in FIG. 6 are as shown in FIG. 10. Details of operations of the robot units 0 and 1 in an operation 3 in FIG. 6 are as shown in FIG. 14. Details of an operation of the robot unit 0 in an operation 4 in FIG. 6 are as shown in FIG. 11. Details of an operation of the robot unit 1 in an operation 5 in FIG. 6 are as shown in FIG. 14. By a series of operations in FIG. 6, the 8-box robot unit of "1" extends, and the 8-box robot unit of "0" that is the head robot unit advances only one position.

Figure 7:
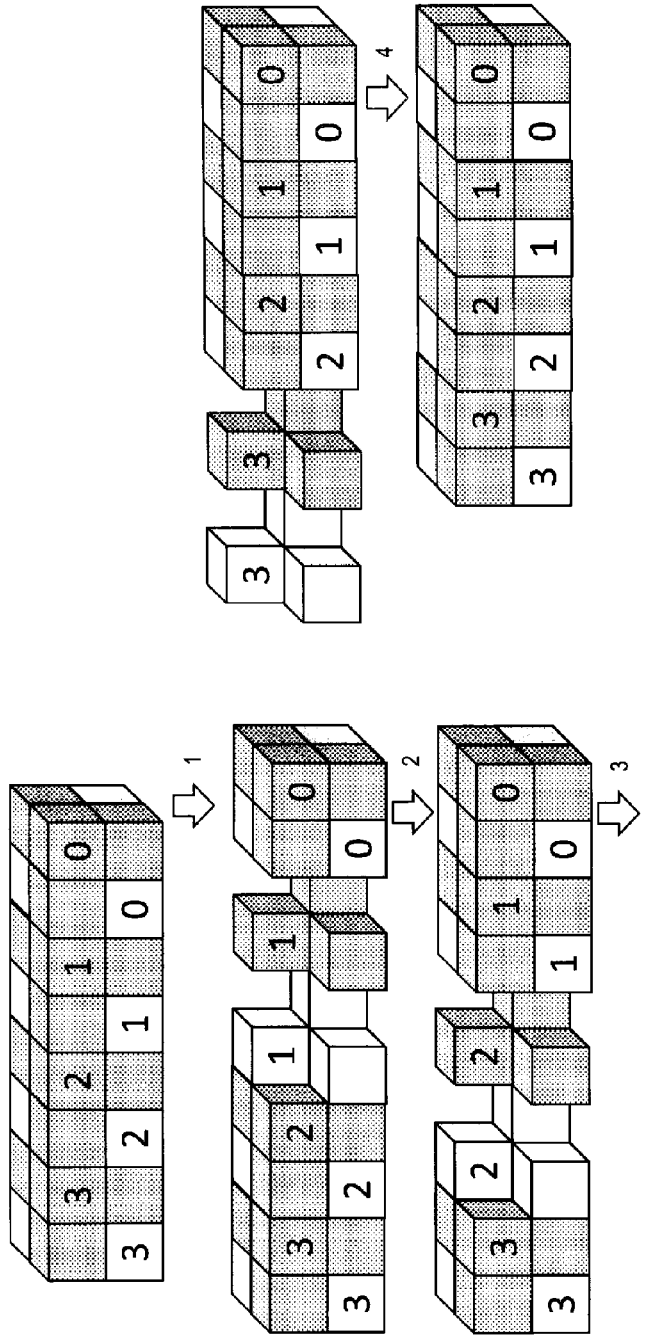
FIG. 7 is a view for explaining tunneling.
Figure 9:
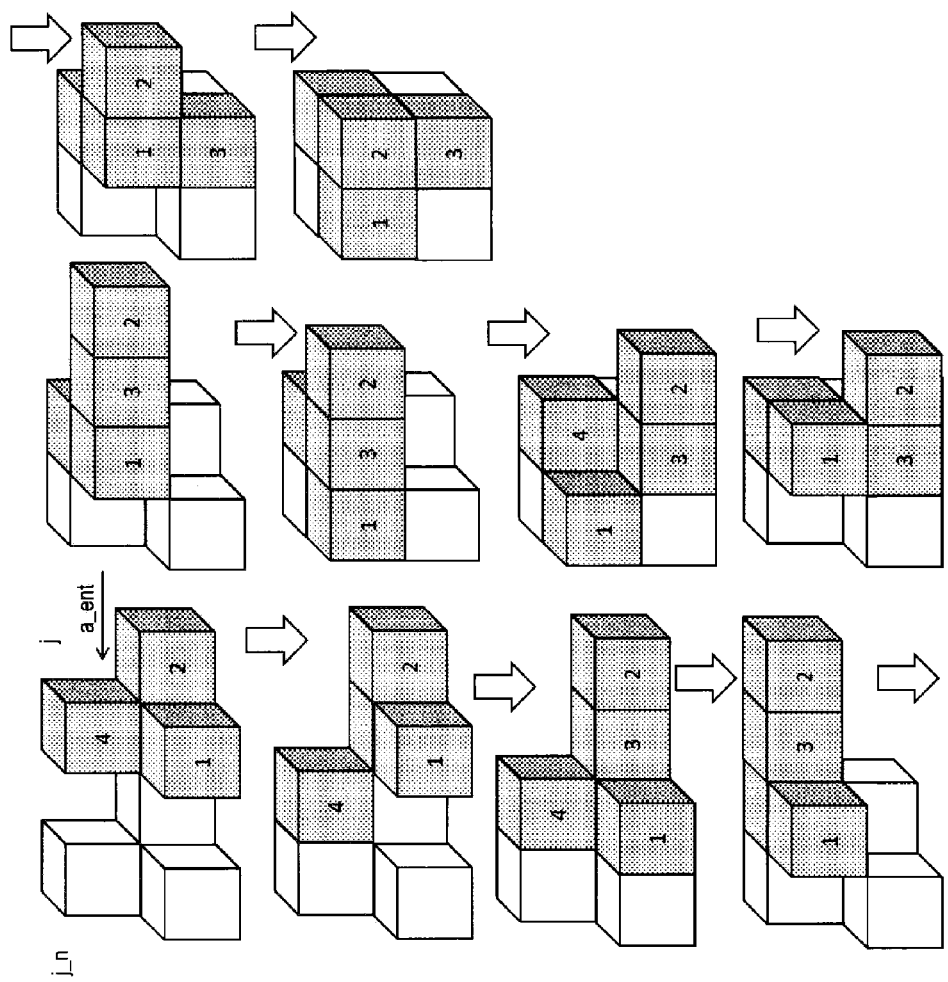
FIG. 9 is a view for explaining movement of the robot unit.

A state of repeating the operation of FIG. 6 is shown in FIG. 7. By an operation of an arrow "2" in FIG. 7, the 8-box robot unit of "1" that is extended contracts, the 8-box robot unit of "2" extends, and the 8-box robot unit of "1" advances only one position. By an operation of an arrow "3" in FIG. 7, the 8-box robot unit of "2" that is extended contracts, the 8-box robot unit of "3" that is the tail robot unit extends, and the 8-box robot unit of "2" advances only one position. By an operation of an arrow "4" in FIG. 7, the 8-box robot unit of "3" that is extended contracts, and the 8-box robot unit of "3" advances only one position. Thereby, an operation of the tail robot unit (Tail) is completed. Details of the operation of the tail robot unit in a final operation in FIG. 7 are as shown in FIG. 8.

Subsequently, a method for selecting the head robot unit Head and the tail robot unit Tail will be described. A common part of the initial position and the goal position is assumed to be divided into Ncommon parts, and the respective parts are set as partial common position sets $C[1]$, $C[2]$, $C[3[, \ldots ,$ $C[Ncommon]$. In other words, the set of the common positions is formed by at least one partial common position set that is not adjacent to each other, and at least one partial common position sets are set as $C[1]$, $C[2]$, $C[3], \ldots, C[Ncommon]$.

First, one thing to note about selection of the head robot unit Head is to prevent any of these Ncommon partial common position sets from being unconnected from the entire robot structure during the transformation operation. For example, when the robots in the initial position S are gradually moved into the goal position G, the number of robots remaining in the initial position S decreases correspondingly. If attention is not paid in this process, there can arise a situation in which no robot that can be used to connect the common portion remains in the robots in the initial position S or the robots in the goal position G. Furthermore, although the head robot unit Head is selected from the goal position G, and the tail robot unit Tail is selected from the initial position S, the common part of the initial position S and the goal position G can work as the initial position S and the goal position G. Consequently, if there is no suitable control, there also arises the fear of occurrence of an endless selection loop of the head robot unit Head and the tail robot unit Tail. In order to avoid these situations, the following new rules (1) to (4) are set.

(1) A set of positions of the robot unit charged by tunneling with a destination position D of the head robot unit Head as a destination position during transformation operation is set as Up. In other words, only the robot unit that is in a position belonging to the set Up is made selectable as the head robot unit Head at an arbitrary time. Note that a process corresponding to rule (1) is performed in step S2 of a robot unit selection unit 2 described later.

(2) Only the robot unit in the position belonging to S-Up is made selectable as the tail robot unit Tail at an arbitrary time. Note that a process corresponding to rule (2) is performed in step S2 of the robot unit selection unit 2 described later.

(3) At a point of time of start of the transformation operation, positions of all the robot units belonging to any one arbitrary $C[i\_start]$, out of $C[1]$, $C[2]$, $C[3]$, . . . , $C[Ncommon]$ are added to the set Up. Note that a process corresponding to rule (3) is performed in step S1 of a set selection unit 1 described later.

(4) When the set Up contacts any of the robot units in $C[i\_connected]$ during the transformation operation, all positions of the robot units in $C[i\_connected]$ in a connected state from the set Up in the set G of the goal positions are added to the set Up. $C[i\_connected]$ is a partial common position set that newly contacts the robot unit in Up during the transformation operation. For example, in FIG. 15(G) described later, C(2) corresponds to $C[i\_connected]$. Note that a process corresponding to rule (4) is performed in step S4 of a set addition unit 4 described later.

Rules (1) and (2) perform control as if only the set Up is an only connection part of the goal position G and the initial position S during tunneling, and thereby create a state to which mathematical expression (1) is applicable during a transformation operation. Rule (3) ensures choices of the head robot unit Head at a time of start of a platoon transformation operation. Rule (4) adds a connected partial common position set to the set Up as the choice of the head robot unit Head when $C[i\_start]$ and the other partial common position set are connected via the goal position G, and can be dealt as one connection part.

By rules (1) to (4), it is possible to realize platoon control that is applicable even when there is a non-connected spot in the common part of the initial position of the robot unit and the goal position of the robot unit.

When the tunneling operation described above is repeatedly performed until all robot units j in the initial position S reaches the goal position G, the homogeneous platoon control is completed.

The above method will be described hereinafter concerning one embodiment of a mobile robot and a control method of the mobile robot that are realized by algorism in a distribution control method.

Here, distribution control is an operation control method in a form in which each robot includes a calculator for each operation control, each robot obtains necessary information while communicating with adjacent robots, and determines an own operation while determining states of the adjacent robots.

First Embodiment

Hereinafter, a mobile robot and a control method of the mobile robot of a first embodiment will be described.

The mobile robot includes a position distance calculation command transmission unit 1, a position distance calculation command transfer unit 2, a reply position distance calculation command transmission unit 3, a direction storage unit 4, a reply position distance calculation command transfer unit 5, a first head robot unit determination command transmission unit 6, a robot unit determination unit 7, a first movement unit 8, a second movement unit 9, a next head robot unit selection command transmission unit 10 and a second head robot unit determination command transmission unit 11, as shown in FIG. 17, for example.

The control method of the mobile robot is realized by respective units of the mobile robot performing processes of step S1 to step S11 described in FIG. 18 and below, for example.

Processes of step S1 to step S5 are processes for grasping a platoon structure in an initial position S. Processes from step S6 to step S11 are processes for moving the robot unit. A predetermined robot in the robot unit is set as a robot h. For example, in each robot unit, a robot with all of X, Y, and Z position coordinates having even numbers is defined as the robot h.

First, a transformation start command is transmitted from a user to a robot i_root that is the robot h of any robot unit in the robot units. The transformation start command also includes platoon form information that is information on a goal position G of each of the robot units. The robot i_root is a predetermined robot in any robot unit in the robot units.

[Position Distance Calculation Command Transmission Unit 1]

When a robot is the predetermined robot i_root in any robot unit in the robot units, the position distance calculation command transmission unit 1 of the robot i_root transmits a position distance calculation command including a relative position from a position of the robot i_root and a number of times of transmission and transfer of position distance calculation command that are respectively set at predetermined initial values to an adjacent robot (step S1).

Hereinafter, the position distance calculation command may be described as a position distance calculation command COM_POSITIONS, the relative position may be described as a relative position (Xr, Yr, Zr), and the number of times of transmission and transfer may be described as a number of times of transmission transfer N_manhattan.

For example, an initial value of the relative position (Xr, Yr, Zr) is (0, 0, 0), and an initial value of the number of times of transmission transfer N_manhattan is 0.

[Position Distance Calculation Command Transfer Unit 2]

When the robot receives a position distance calculation command, the position distance calculation command transfer unit 2 of the robot increments the number of times of transmission and transfer included in the position distance calculation command, updates the relative position included in the position distance calculation command according to a direction in which the position distance calculation command is received, and transfers a position distance calculation command including the incremented number of times of transmission and transfer and the updated relative position to an adjacent robot other than the robot that transmits the position distance calculation command, only once (step S2).

Note that the position distance calculation command transfer unit 2 does not transfer the position distance calculation command COM_POSITIONS to the robot that transmits the position distance calculation command COM_POSITIONS to the position distance calculation command transfer unit 2. Thereby, it is possible to prevent the position distance calculation command COM_POSITIONS from being transmitted and received again and again endlessly in the robot structure.

[Reply Position Distance Calculation Command Transmission Unit 3]

When a robot receives the position distance calculation command first, the reply position distance calculation command transmission unit 3 of the robot transmits a reply position distance calculation command including the incremented number of times of transmission and transfer and the updated relative position to the robot that transmits the position distance calculation command (step S3).

Hereinafter, the reply position distance calculation command may be described as a reply position distance calculation command COM_Positions_Reply.

A value of the number of times of transmission transfer N_manhattan at the time of receiving the position distance calculation command COM_POSITIONS first corresponds to a Manhattan distance from the robot i_root of this robot.

[Direction Storage Unit 4]

When a robot receives the position distance calculation command first, the direction storage unit 4 of the robot stores a direction of the robot that transmits the position distance calculation command as an a_to_root direction (step S4).

Hereinafter, when each robot transmits some information to the robot i_root, each robot transmits the information in a direction of a_to_root.

[Reply Position Distance Calculation Command Transfer Unit 5]

When a robot receives the reply position distance calculation command, the reply position distance calculation command transfer unit 5 of the robot transfers the received reply position distance calculation command to the a_to_root direction that is read from the direction storage unit 4 (step S5).

Each robot receiving each reply position distance calculation command performs a process of step S5, and thereby each reply position distance calculation command finally reaches the robot i_root.

[First Head Robot Unit Determination Command Transmission unit 6]

When a robot is the robot i_root, and receives the reply position distance calculation commands that are transmitted by all robots, the first head robot unit determination command transmission unit 6 of the robot selects a certain partial common position set as the set Up, based on a position of each robot based on the relative position included in the replay position distance calculation command, selects a position that is adjacent to a position that belongs to the set of the goal positions but does not belong to the set of the common positions, and belongs to the set Up, as the head position Head, and transmits a head robot unit determination command including the relative position and information on the set Up to a predetermined robot in the head robot unit that is the robot unit located in the head position Head (step S6).

Hereinafter, the head robot unit determination command may be described as a head robot unit determination command COM_Head_Decision.

[Robot Unit Determination Unit 7]

When a robot is a predetermined robot in the head robot unit, and receives the head robot unit determination command, the robot unit determination unit 7 of the robot determines robot units H0, H1, . . . , Hnt−1 included in a path from the head position Head to the tail position Tail with a position of the tail robot unit that is the robot unit that is located in the position that does not belong to the set Up and is located in the initial position, and is the robot unit that can maintain connectivity of the robot structure even if the robot unit is moved as the tail position Tail (step S7).

Here, a robot unit H0 is a robot unit located in the head position Head, and a robot unit Hnt−1 is a robot unit that is located in the tail position Tail.

Here, the path from the head position Head to the tail position Tail is a path that has no position of the same Manhattan distance in the positions on the path. The path from the head position Head to the tail position Tail is an optimal path from the head position Head to the tail position Tail, for example. The optimal path is a path that can be traced between Head and Tail with the same number of times of movement as the number of steps of the Manhattan distance.

[First Movement Unit 8]

In a case of a predetermined robot in the robot unit Hi as the robot unit with i=0, . . . , nt-2, the first movement unit 8 of the robot moves the robot unit Hi to the destination position D, or a position where the robot unit Hi−1 is located before movement by the first movement unit 8 while extending the robot unit Hi+1, with a position that is adjacent to the head position Head, and that is the position that belongs to the set of the goal positions but does not belong to the set of the common positions as the goal position D (step S8). "The destination position D, or the position where the robot unit Hi−1 is located before movement by the first movement unit 8" is, in other words, a position that is adjacent to the position of the mobile robot unit Hi, as well as a position on the path, and is a position that is close to the destination position D by one.

Note that by the process of step S8, the robot unit H0 is moved to the destination position D, and the robot units H1, . . . , Hnt-2 are respectively moved to positions where the robot units H0, . . . , Hnt-1 are located before movement by the first movement unit 8. Furthermore, the robot unit Hnt-1 becomes an extended state.

Hereinafter, an example of the process of step S8 by the first movement unit 8 will be described.

First, the robot h in the robot unit H0 issues a command COM_Step_1 concerning movement of the robot unit H0 to the destination position D (operation 1 in FIG. 6). The command COM_Step_1 is relayed among the robots that operate during movement of UCMM of the robot unit H0 to the destination position D. When the operation of UCMM to the destination position D is completed, the command COM_Step_1 is returned to the robot h in the robot unit H0.

Subsequently, the robot h in the robot unit H0 issues a command COM_Step_2 concerning movement of UCMM of the robot unit H1 to the robot unit H0 (operation 2 in FIG. 6). The command COM_Step_2 is relayed among the robots that operate during movement of UCMM of the robot unit H1 to the robot unit H0 similarly to the command COM_Step_1. When the operation of UCMM of the robot unit H1 to the robot unit H0 is completed, the command COM_Step_2 is returned to the robot h in the robot unit H0.

Subsequently, the robot h in the robot unit H0 issues a command COM_Step_3 and a command COM_step_4 concerning transformation of LCMM in the destination position D and the robot unit H1 to UCMM (operation 3 in FIG. 6). The command COM_Step_3 is transmitted to LCMM in the destination position D from the robot h of the robot unit H0, and the command COM_Step_4 is transmitted from h to the LCMM in the robot unit H1. Thereafter, the respective transmitted commands are relayed among robots that operate during transformation similarly to the command COM_Step_1. When a transformation operation of each LCMM to UCMMH is completed, the command COM_Step_3 and the command COM_Step_4 are returned to the robot h in the robot unit H0.

Subsequently, the robot h in the robot unit H0 issues a command COM_Step_5 concerning movement of LCMM in the robot unit H0 to the destination position D (operation 4 in FIG. 6). The command COM_Step_5 is relayed among the robots that operate during transformation similarly to the command COM_Step_1. When movement of LCMM is completed, the command COM_Step_5 is returned to the robot h in the robot unit H0. Here, it should be noted that the robot h in the robot unit H0 is already in the destination position D at this point of time.

Subsequently, the robot h in the robot unit H0 issues a command COM_Step_6 concerning transformation of UCMMs in the robot units H0 and H1 to LCMM (operation 5 in FIG. 6). The command COM_Step_6 is relayed among the robots that operate during transformation similarly to the command COM_Step_1. An example of transformation operation of two adjacent UCMMs is shown in FIG. 16. When transformation is completed, the command COM_Step_6 reaches a robot that should be a new robot h in the robot unit H1. Here, the command COM_Step_6 must include information concerning the positions of the robot units H0, H1, H2, . . . , Hnt−1. This is because from this point of time, tunneling operation (from the operation 2 in FIG. 6) of the robot unit H1 to H0 starts, with the robot unit H1 as the head. Thereafter, the command COM_Step_2 is transmitted from the robot h in the robot unit H1. The transmitted command COM_Step_2 is relayed as before, and is returned to the robot h in the robot unit H1. Subsequently to this, relay of the commands COM_Step_3, COM_Step_4, and COM_Step_5 that are transmitted from the robot h in the robot unit H1 is performed, and when the command COM_Step_5 returns to the robot h in the robot unit H1, the command COM_Step_6 is issued. The command COM_Step_6 reaches a new robot h in the robot unit H2. In this way, the command relay is repeated until the command COM_Step_5 that is issued from the robot h in the robot unit Hnt-2 returns to the robot h in the robot unit Hnt-2.

[Second Movement Unit 9]

When a robot is a predetermined robot in the robot unit Hnt-2, the second movement unit 9 of the robot moves the robot unit Hnt-1 to a position where the robot unit Hnt-2 is located before movement by the first movement unit 8 (step S9).

In other words, finally, a command COM_Step_7 for LCMM in the robot unit Hnt-t1 to enter the robot unit Hnt-2 is transmitted by the robot h in the robot unit Hnt-2, is relayed as before, and returns to the robot h in the robot unit Hnt-2.

[Next Head Robot Unit Selection Command Transmission Unit 10]

When a robot is a predetermined robot in the robot unit Hnt-2, the next head robot unit selection command transmission unit 10 of the robot transmits a next head robot unit selection command to a predetermined robot in a head robot unit (step S10).

Hereinafter, the next head robot unit selection command may be described as a next head robot unit selection command COM_Next_Head.

The next head robot unit selection command COM_Next_Head propagates through the robot units H0, H1, H2, . . . , Hnt-3 from the robot unit Hnt-2 to the destination position D to reach the robot h in the destination position D.

[Second Head Robot Unit Determination Command Transmission Unit 11]

When a robot is a predetermined robot in the head robot unit, and receives the next head robot unit determination command, the second head robot unit determination command transmission unit 11 of the robot updates the set Up by adding the destination position D to the set Up, and thereafter adding a position of a robot unit when the robot unit that contacts the set Up, and is not located in the Up but is located in the goal position is present, and a position of a robot unit that is in a connected state via only the goal position from the robot unit to the set Up, updates a relative position, selects a position that is adjacent to a position that belongs to a set of the goal positions but does not belong to the set of common positions, and belongs to the set Up as the head position Head, based on the position of each robot based on the relative position, and transmits the head robot unit determination command including the relative position and the information on the set Up to a predetermined robot in the head robot unit that is the robot unit located in the head position Head (step S11).

In other words, the robot h that receives the next head robot unit determination command COM_Next_Head and is in the destination position D determines a next head and D, and updates the set Up. Furthermore, the robot h also updates information (relative position) concerning positions of all robot units that is retained in the h. Update of the relative position can be performed by deleting the position of Hnt−1, and newly adding the position of D, for example.

Thereafter, the head robot unit determination command COM_Head_Decision including the information on them is transmitted to the robot h in the next head. Thereafter, the robot h that receives the head robot unit determination command COM_Head_Decision repeats relay of the commands COM_Step_1, COM_Step_2, COM_Step_3, COM_Step_4, COM_Step_5, COM_Step_6, and COM_Step_7 for the tunneling operation as before.

In this way, the processes of the robot unit determination unit 7, the first movement unit 8, the second movement unit 9, the next head robot unit selection command transmission unit 10 and the second head robot unit determination command transmission unit 11 are repeatedly performed until there is no position where the robot unit does not exist in the goal position.

Note that the commands COM_Step_1, COM_Step_2, COM_Step_3, COM_Step_4, COM_Step_5, COM_Step_6, and COM_Step_7 include information concerning a route where the commands are relayed during operation of the robots.

For example, when an operation from H0 to D is in an X positive direction, in an operation of (1) in FIG. 12, the command COM_Step_1 is relayed in the X positive direction, a Y positive direction, and a Z positive direction, and reaches a robot (robot c in FIG. 12) in H0 that operates first. In other words, in the operation of (1) in FIG. 12, the command COM_Step_1 is relayed to a robot f from a robot e, and is relayed to the robot c from the robot f, before robots a and c move. Note that in FIG. 12, the robot e corresponds to the predetermined robot h in the robot unit H0.

Furthermore, in an operation of (2) in FIG. 12, the command COM_Step_1 is relayed to the robot b from the robot c, before the robot b moves.

Furthermore, in an operation of (3) in FIG. 12, the command COM_Step_1 is relayed to the robot "a" from the robot b before the robots "a" and b move.

Furthermore, in operations of (4) and (5) in FIG. 12, the command COM_Step_1 is relayed to the robot d from the robot "a", and is relayed to the robot c from the robot d, before the robot c moves.

Furthermore, in an operation of (6) in FIG. 12, the command COM_Step_1 is relayed to the robot b from the robot c, is relayed to the robot "a" from the robot b, and is relayed to the robot d from the robot "a", before the robots d and "a" move.

Furthermore, in an operation of (7) in FIG. 12, the command COM_Step_1 is relayed to the robot "a" from the robot d, before the robot "a" moves.

Note that in the operation of (1) in FIG. 12, the robot c and the robot "a" must simultaneously move one step in the X positive direction, and in order to realize the simultaneous operation, exchange of a local command is performed between the robots "a" and c. First, when the robot c receives the command COM_Step_1, the robot c commands the robot "a" to release all mechanical connections with the other robots adjacent to the robot "a" except for a mechanical connection with the robot c. The command is a mechanical connection release command COM_Request_Synch. The robot "a" that receives the mechanical connection release command COM_Request_Synch releases the mechanical connections except for the mechanical connection with the robot c as commanded, and replies to the robot c that execution of the command is completed. The reply is COM_Reply_Synch. The robot c that receives the reply from the robot "a" executes one-step movement in the X positive direction with the robot "a". The robot "a" under the operation does nothing while maintaining the mechanical connection with the robot c, and follows the robot c. Recovery of the mechanical connection with an adjacent module of the robot "a" after the simultaneous operation of the robots c and "a" is completed is also performed by similar exchange of the robots "a" and c.

Transmission of the mechanical connection release command COM_Request_Synch and reply of the reply COM_Reply_Synch are performed by a mechanical connection release command transmission unit and a reply unit included by each robot. Note that the mechanical connection release command transmission unit and the reply unit are not illustrated in FIG. 17.

In a case of simultaneous operations of more than two adjacent robots, the simultaneous operations are similarly performed by relay of the COM_Request_Synch and the COM_Reply_Synch.

The commands COM_Step_1, COM_Step_2, COM_Step_3, COM_Step_4, COM_Step_5, COM_Step_6, and COM_Step_7 also include information concerning in which robot relay of the COM_Request_Synch and COM_Reply_Synch is performed.

SPECIFIC EXAMPLE

Figure 15:
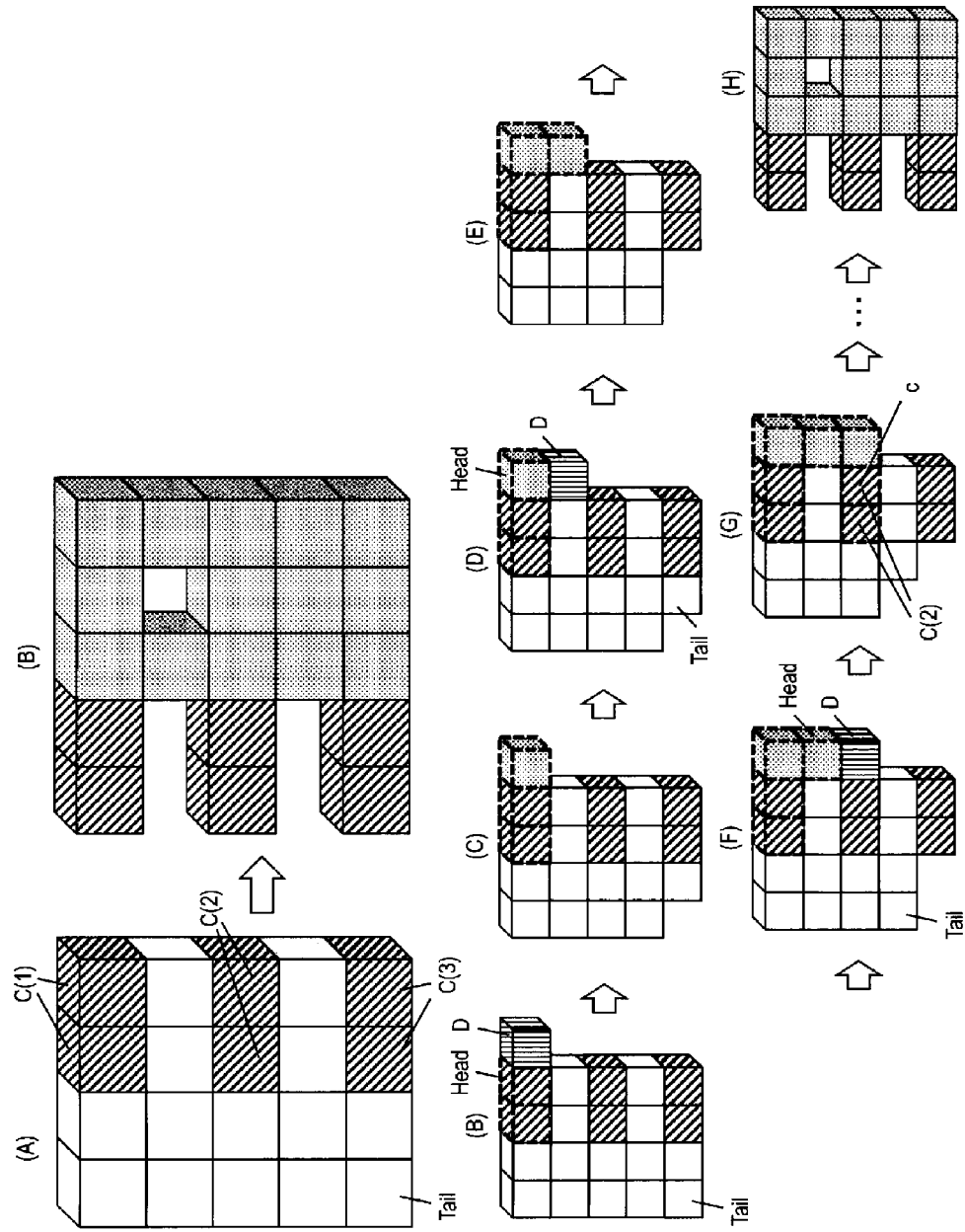
FIG. 15 is a view for explaining movement of the robot unit.

A specific example of a control process by the mobile robot and the control method of the mobile robot will be described by using FIG. 15.

FIG. 15(A) shows an initial position of a robot unit, and FIG. 15(B) shows a goal position of the robot unit. In FIGS. 15(A) and (B), white cubes and slashed cubes show an initial position of a robot unit, and dotted cubes and slashed cubes show a goal position of the robot unit. The slashed cubes show a common position that is a common part of the initial position and the goal position of the robot unit.

In FIG. 15(A), a set of the common positions is formed by three partial common position sets C(1), C(2), and C(3) that are not adjacent to one another. In FIG. 15(A), a position of two uppermost slashed cubes is C(1), a position of two central slashed cubes is C(2), and a position of two lowermost slashed cubes is C(3).

The first head robot unit determination command transmission unit 6 selects the partial common position set C(1) as the set Up as shown in FIG. 15(B), for example (step S6). In FIG. 15(B) to FIG. 15(G), positions belonging to the set Up are shown by thick dotted lines.

The first head robot unit determination command transmission unit 6 selects the head robot unit Head, the tail robot unit Tail, and the destination position D as shown in FIG. 15(B), for example (step S6).

The robot unit determination unit 7, the first movement unit 8 and the second movement unit 9 move a series of robot units from the head robot unit Head to the tail robot unit Tail with the destination position D in FIG. 15(B) as a destination position (step S7 to step S9). As a result, positions of the robot units become as in FIG. 15(C).

The second head robot unit determination command transmission unit 11 adds the destination position D in FIG. 15(B) to the set Up (step S11). In this case, there is no robot unit that is in contact with the set Up and is not located in the set Up but located in the goal position, so that positions other than the destination position D are not added to the set Up. As a result, the position belonging to the set Up becomes as in FIG. 15(C).

Since there remains a position where the robot does not exist in the goal position, the flow returns to the process in step S7 after the processes in step S10 and step S11 are performed.

The second head robot unit determination command transmission unit 11 and the robot unit determination unit 7 select the head robot unit Head, the tail robot unit Tail, and the destination position D as shown in FIG. 15(D), for example (step S11, step S7).

The first movement unit 8 and the second movement unit 9 move the series of robot units from the head robot unit Head to the tail robot unit Tail with the destination position D in FIG. 15(D) as the destination position (step S8, step S9). As a result, the positions of the robot units become as in FIG. 15(E).

The second head robot unit determination command transmission unit 11 adds the destination position D in FIG. 15(D) to the set Up (step S11). In this case, there exists no robot unit that is in contact with the set Up, and is not located in the set Up but located in the goal position, so that the positions other than the destination position D are not added to the set Up. As a result, the positions belonging to the set Up become as in FIG. 15(E).

Since there remains the position where the robot does not exist in the goal position, the flow returns to the process in step S7 after the processes of step S10 and step S11 become performed.

The second head robot unit determination command transmission unit 11 and the robot unit determination unit 7 select the head robot unit Head, the tail robot unit Tail and the goal position D as shown in FIG. 15(F), for example (step S11, step S7).

The first movement unit 8 and the second movement unit 9 move a series of robot units from the head robot unit Head to the tail robot unit Tail with the destination position D in FIG. 15(F) as the destination position (step S8, step S9). As a result, the positions of the robot units become as in FIG. 15(G).

The second head robot unit determination command transmission unit 11 adds the destination position D in FIG. 15(F) to the set Up (step S11). In this case, there exists a robot unit that is in contact with the set Up, and is not located in the set Up but located in the goal position (robot unit located in a position shown by c in FIG. 15(G)). Therefore, in this case, the set addition unit 4 adds the position c, and a position of the robot unit that is in a connected state via only the goal position (including the common position) from the robot unit located in the position c (that is, a position belonging to the partial common position set C(2) except for the position c) to the set Up. As a result, the position belonging to the set Up becomes as in FIG. 15(G). Note that in this case, C[2] is C[i_connected]. By the process of step S11, C[2] that is C[i_connected] is added to the set Up.

By repeating the processes as above, the robot unit can be moved to the goal position finally as shown in FIG. 15(H).

[Modification]

The embodiment of the present invention is described thus far, but the specific configuration is not limited to these embodiments, and it is needless to say that suitable change in design and the like within the range without departing from the gist of the present invention are included in the present invention.

The various processes described in the embodiment are not only executed in time series according to the order described, but also may be executed in parallel or individually according to the processing ability of the device that executes the processes or necessity.

For example, exchange of data among the components of the respective robots may be directly performed, or may be performed via a storage unit not illustrated.

Furthermore, determination of the tail position Tail and the goal position D may be performed in any of the first head robot unit determination command transmission unit 6, the robot unit determination unit 7, the first movement unit 8 and the second head robot unit determination command transmission unit 11.

Furthermore, in the above described embodiment, a so-called 8-box riding cube is used as the robot unit, but a robot unit such as an 8-box compressing type, and a 4-box riding cube may be used if only tunneling operation is possible. Furthermore, a robot other than a so-called shear robot, and an extension/contraction robot may be used as the robot unit if only tunneling operation is possible.

[Program, Storage Medium]

When the various processing functions in each of the robots described above are realized by a computer, the processing contents of the functions that each of the robots should have are described by a program. The program is executed by the computer, and thereby the various processing functions in each of the robots described above are realized on the computer. For example, the aforementioned various processes can be carried out by causing a recording unit 2020 of a computer shown in FIG. 19 to read a program to be executed, and causing a control unit 2010, an input unit 2030, an output unit 2040 and the like to operate.

The program describing the processing contents can be recorded in a recording medium readable by the computer. The recording medium readable by a computer may be any recording medium such as a magnetic recording device, an optical disk, a magneto-optic recording medium, and a semiconductor memory, for example.

Furthermore, the program is distributed by selling, transferring, lending or other procedures of portable recording media such as DVDs and CD-ROMs on which the program is recorded, for example. Furthermore, the program may be configured to be distributed by storing the program in a storage device of a server computer, and transferring the program to other computers from the server computer via a network.

The computer that executes the program like this firstly stores the program recorded in a portable recording medium or the program transferred from the server computer in an own storage device once, for example. Subsequently, at a time of execution of the process, the computer reads the program stored in the own storage device, and executes the process according to the read program. Furthermore, as another execution form of this program, a computer may directly read the program from a portable recording medium, and execute the process according to the program, or every time the program is transferred to the computer from the server computer, the computer may successively execute the process according to the received program. Furthermore the aforementioned process may be configured to be executed by a so-called ASP (Application Service Provider) type service, that realizes a processing function by only an execution instruction and a result acquisition without performing transfer of the program to the computer, from the server computer. Note that the program in this form includes information used for processing by an electronic computer and equivalent to a program (data or the like that is not a direct instruction to a computer but has a property of defining processing of the computer).

Furthermore, in this form, the present device is formed by causing a predetermined program to be executed on a computer, but at least part of these processing contents may be realized in terms of hardware.

The invention claimed is:

1. A mobile robot, comprising a processor configured to execute a method comprising:
   transmitting a position distance calculation command to an adjacent robot, wherein the position distance calculation command comprises a relative position from a position of a predetermined robot (hereinafter referred to as a robot "i_root") and a number of times of transmission and transfer of the position distance calculation command that are respectively set at predetermined initial values,
      wherein a predetermined initial position and a predetermined goal position are set for each of robot units, a common position represents a common part of the initial position and the goal position, a set of common positions is formed by at least one partial common position set that is not adjacent to each other, and connectivity of a robot structure indicating a mass robot structure formed by each of the robot units being adjacent to other robot units;
   upon receiving the position distance calculation command:
   incrementing the number of times of transmission and transfer included in the position distance calculation command;
   updating the relative position included in the position distance calculation command according to a direction in which the position distance calculation command is received; and
   transferring a position distance calculation command including the incremented number of times of transmission and transfer and the updated relative position to an adjacent robot other than the robot that transmits the position distance calculation command only once;
   when the position distance calculation command is received first, transmitting a reply position distance calculation command including the incremented number of times of transmission and transfer and the updated relative position to the robot that transmits the position distance calculation command;
   storing a direction of the robot that transmits the position distance calculation command as an a_to_root direction when the position distance calculation command is received first;
   upon receipt of the reply position distance calculation command, transferring the received reply position distance calculation command in the a_to_root direction;
   in a case of the robot being i_root and upon receipt of reply position distance calculation commands transmitted by all robots:
      selecting a partial common position set as a set Up based on a position of each of the robots according to relative positions included in the reply position distance calculation commands;
      selecting a head position Head, wherein the head position Head is adjacent to a position among positions in a set of goal positions, outside the set of the common positions, and among positions in the set Up, wherein the set of goal positions represents goal positions of units of the robot; and
      transmitting a head robot unit determination command including information on the relative position and the set Up, to a predetermined robot in a head robot unit that is a robot unit located in the head position Head;
   in a case of being the predetermined robot in the head robot unit, and upon receipt of the head robot unit determination command, determining robot units H0, H1, . . . , Hnt−1 included in a path from the head position Head to a tail position Tail, with a position of a tail robot unit that is a robot unit located in a position that does not belong to the set Up and located in the initial position, and is a robot unit that can maintain connectivity of the robot structure even when the robot unit is moved, as the tail position Tail;
   in a case of being a predetermined robot in a robot unit Hi, where i=0, . . . , nt-2, moving the robot unit Hi to a destination position D, or a position in which a robot unit Hi−1 is located before movement while extending a robot unit Hi+1, with a position that is a position adjacent to the head position Head, and belongs to the set of the goal positions but does not belong to the set of the common positions, as the destination position D;
   in a case of being a predetermined robot in a robot unit Hnt−2, moving a robot unit Hnt−1 to a position where the robot unit Hnt−2 is located before movement;
   in a case of being a predetermined robot in the robot unit Hnt−2, transmitting a next head robot unit selection command to a predetermined robot in the head robot unit; and
   in a case of being a predetermined robot in the head robot unit, and upon receipt of a next head robot unit determination command, when there is a robot unit that is in contact with the set Up and is not located in the set Up but located in the goal position after the destination position D is added to the set Up:
      updating the set Up by adding a position of the robot unit, and a position of a robot unit in a connected state via only the goal position from the robot unit to the set Up;
      updating the relative position,
      selecting a position that is a position adjacent to a position that belongs to the set of the goal positions but does not belong to the set of the common positions, and belongs to the set Up, as a head position Head, based on a position of each of the robots based on the relative position; and
      transmitting a head robot unit determination command including information on the relative position and the set Up to a predetermined robot in a head robot unit that is a robot unit located in the head position Head,
   repeating a set of the determining, the moving the robot Hi, the moving the robot unit nt-1, the moving the robot unit Hnt−2, the transmitting a next head robot unit selection command, the updating the set Up, the updating the relative position, the selecting the position, and the transmitting the head robot unit determination command until there is no position including no robot unit in the goal position.

2. The mobile robot in claim 1,
wherein commands for performing the movement are relayed among the robots that operate when each of the robot units moves.

3. A computer-implemented method for controlling a mobile robot, comprising:
transmitting a position distance calculation command to an adjacent robot, wherein the position distance calculation command comprises a relative position from a position of a predetermined robot (hereinafter referred to as a robot "i_root" and the number of times of transmission and transfer of the position distance calculation command that are respectively set at predetermined initial values,
wherein a predetermined initial position and a predetermined goal position are set for each of robot units, a common position represents a common part of the initial position and the goal position, a set of common positions is formed by at least one partial common position set that is not adjacent to each other, and connectivity of a robot structure indicating a mass robot structure formed by each of the robot units being adjacent to other robot units;
upon receipt of the position distance calculation command:
incrementing the number of times of transmission and transfer included in the position distance calculation command:
updating the relative position included in the position distance calculation command according to a direction in which the position distance calculation command is received; and
transferring a position distance calculation command including the incremented number of times of transmission and transfer and the updated relative position to an adjacent robot other than the robot that transmits the position distance calculation command only once;
when the position distance calculation command is received first, transmitting a reply position distance calculation command including the incremented number of times of transmission and transfer and the updated relative position to the robot that transmits the position distance calculation command;
storing a direction of the robot that transmits the position distance calculation command as an a_to_root direction when the position distance calculation command is received first;
upon receipt of the reply position distance calculation command, transferring the received reply position distance calculation command in the a_to_root direction;
in a case of the robot being i_root, and upon receipt of reply position distance calculation commands transmitted by all robots:
selecting a certain partial common position set as a set Up based on a position of each of the robots according to relative positions included in the reply position distance calculation commands;
selecting a head position Head, wherein the head position Head is adjacent to a position among positions in a set of goal positions, outside the set of the common positions, and among positions in the set Up, wherein the set of goal positions represents goal positions of units of the robot; and transmitting a head robot unit determination command including information on the relative position and the set Up, to a predetermined robot in a head robot unit that is a robot unit located in the head position Head;
in a case of being the predetermined robot in the head robot unit, and upon receipt of the head robot unit determination command, determining robot units H0, H1, . . . , Hnt−1 included in a path from the head position Head to a tail position Tail with a position of a tail robot unit that is a robot unit located in a position that does not belong to the set Up and located in the initial position, and is a robot unit that can maintain connectivity of the robot structure even when the robot unit is moved, as the tail position Tail;
in a case of being a predetermined robot in a robot unit Hi, where i=0, nt-2, moving the robot unit Hi to a destination position D, or a position in which a robot unit Hi is located before movement by the first movement unit while extending a robot unit Hi+1 with a position that is a position adjacent to the head position Head, and belongs to the set of the goal positions but does not belong to the set of the common positions, as the destination position D;
in a case of being a predetermined robot in a robot unit Hnt−2, moving a robot unit Hnt−1 to a position where the robot unit Hnt−2 is located before movement;
a next head robot unit selection command transmission step of a next head robot unit selection command transmission unit, in a case of being a predetermined robot in the robot unit Hnt−2, transmitting a next head robot unit selection command to a predetermined robot in the head robot unit; and
in a case of being a predetermined robot in the head robot unit, and upon receipt of a next head robot unit determination command, when there is a robot unit that is in contact with the set Up and is not located in the set Up but located in the goal position after the destination position D is added to the set Up, updating the set Up by adding a position of the robot unit, and a position of a robot unit in a connected state via only the goal position from the robot unit to the set Up, updating the relative position;
selecting a position that is a position adjacent to a position that belongs to the set of the goal positions but does not belong to the set of the common position, and belongs to the set Up, as a head position Head, based on a position of each of the robots based on the relative position; and
transmitting a head robot unit determination command including information on the relative position and the set Up to a predetermined robot in a head robot unit that is a robot unit located in the head position Head,
repeating a set of the determining, the moving the robot Hi, the moving the robot unit nt-1, the moving the robot unit Hnt−2, the transmitting a next head robot unit selection command, the updating the set Up, the updating the relative position, the selecting the position, and the transmitting the head robot unit determination command until there is no position including no robot unit in the goal position.

4. The computer-implemented method according to claim 3,
wherein commands for performing the movement are relayed among the robots that operate when each of the robot units moves.

5. A system for controlling a mobile robot, the system comprising a processor configured to execute a method comprising:
- transmitting a position distance calculation command to an adjacent robot, wherein the position distance calculation command comprises a relative position from a position of a predetermined robot (hereinafter referred to as a robot "i_root") and the number of times of transmission and transfer of the position distance calculation command that are respectively set at predetermined initial values,
  - wherein a predetermined initial position and a predetermined goal position are set for each of robot units, a common position represents a common part of the initial position and the goal position, a set of common positions is formed by at least one partial common position set that is not adjacent to each other, and connectivity of a robot structure indicating a mass robot structure formed by each of the robot units being adjacent to other robot units;
- upon receipt of the position distance calculation command:
  - incrementing the number of times of transmission and transfer included in the position distance calculation command;
  - updating the relative position included in the position distance calculation command according to a direction in which the position distance calculation command is received; and
  - transferring a position distance calculation command including the incremented number of times of transmission and transfer and the updated relative position to an adjacent robot other than the robot that transmits the position distance calculation command only once;
- when the position distance calculation command is received first, transmitting a reply position distance calculation command including the incremented number of times of transmission and transfer and the updated relative position to the robot that transmits the position distance calculation command;
- storing a direction of the robot that transmits the position distance calculation command as an a_to_root direction when the position distance calculation command is received first;
- upon receipt of the reply position distance calculation command, transferring the received reply position distance calculation command in the a_to_root direction;
- in a case of the robot being i_root, and upon receipt of reply position distance calculation commands transmitted by all robots:
  - selecting a partial common position set as a set Up based on a position of each of the robots according to relative positions included in the reply position distance calculation commands;
  - selecting a head position Head, wherein the head position Head is adjacent to a position among positions in a set of goal positions, outside the set of the common positions, and among positions in the set Up, wherein the set of goal positions represents goal positions of units of the robot; and
  - transmitting a head robot unit determination command including information on the relative position and the set Up, to a predetermined robot in a head robot unit that is a robot unit located in the head position Head;
- in a case of being the predetermined robot in the head robot unit, and upon receipt of the head robot unit determination command, determining robot units H0, H1, . . . , Hnt−1 included in a path from the head position Head to a tail position Tail with a position of a tail robot unit that is a robot unit located in a position that does not belong to the set Up and located in the initial position, and is a robot unit that can maintain connectivity of the robot structure even when the robot unit is moved, as the tail position Tail;
- in a case of being a predetermined robot in a robot unit Hi, where i=0, nt-2, moving the robot unit Hi to a destination position D, or a position in which a robot unit Hi−1 is located before movement by the first movement unit while extending a robot unit Hi+1 with a position that is a position adjacent to the head position Head, and belongs to the set of the goal positions but does not belong to the set of the common positions, as the destination position D;
- in a case of being a predetermined robot in a robot unit Hnt−2, moving a robot unit Hnt−1 to a position where the robot unit Hnt−2 is located before movement;
- a next head robot unit selection command transmission step of a next head robot unit selection command transmission unit, in a case of being a predetermined robot in the robot unit Hnt−2, transmitting a next head robot unit selection command to a predetermined robot in the head robot unit; and
- in a case of being a predetermined robot in the head robot unit, and upon receipt of a next head robot unit determination command, when there is a robot unit that is in contact with the set Up and is not located in the set Up but located in the goal position after the destination position D is added to the set Up:
  - updating the set Up by adding a position of the robot unit, and a position of a robot unit in a connected state via only the goal position from the robot unit to the set Up;
  - updating the relative position;
  - selecting a position that is a position adjacent to a position that belongs to the set of the goal positions but does not belong to the set of the common position, and belongs to the set Up, as a head position Head, based on a position of each of the robots based on the relative position; and
  - transmitting a head robot unit determination command including information on the relative position and the set Up to a predetermined robot in a head robot unit that is a robot unit located in the head position Head;
- repeating a set of the determining, the moving the robot Hi, the moving the robot unit nt-1, the moving the robot unit Hnt−2, the transmitting a next head robot unit selection command, the updating the set Up, the updating the relative position, the selecting the position, and the transmitting the head robot unit determination command until there is no position including no robot unit in the goal position.

6. The system according to claim 5,
- wherein commands for performing the movement are relayed among the robots that operate when each of the robot units moves.

* * * * *